(12) United States Patent
Ono

(10) Patent No.: US 11,341,771 B2
(45) Date of Patent: May 24, 2022

(54) OBJECT IDENTIFICATION ELECTRONIC DEVICE

(71) Applicant: Sony Semiconductor Solutions Corporation, Kanagawa (JP)

(72) Inventor: Hiroaki Ono, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 49 days.

(21) Appl. No.: 16/343,578

(22) PCT Filed: Aug. 21, 2018

(86) PCT No.: PCT/JP2018/030715
§ 371 (c)(1),
(2) Date: Apr. 19, 2019

(87) PCT Pub. No.: WO2019/077863
PCT Pub. Date: Apr. 25, 2019

(65) Prior Publication Data
US 2021/0334517 A1 Oct. 28, 2021

(30) Foreign Application Priority Data
Oct. 18, 2017 (JP) ............................ JP2017-201524

(51) Int. Cl.
*G06K 9/00* (2022.01)
*G06V 40/16* (2022.01)
(Continued)

(52) U.S. Cl.
CPC .......... *G06V 40/172* (2022.01); *G01S 17/894* (2020.01); *G06K 9/6201* (2013.01);
(Continued)

(58) Field of Classification Search
CPC ........... G06K 9/00288; G06K 9/00255; G06K 9/3208; G06K 9/6201; G06K 9/00281;
(Continued)

(56) References Cited

U.S. PATENT DOCUMENTS

| 4,380,391 A * | 4/1983 | Buser .................... G01S 7/4802 250/227.12 |
| 9,025,019 B2 * | 5/2015 | Meinherz .............. G01S 17/894 348/91 |

(Continued)

FOREIGN PATENT DOCUMENTS

| CN | 105868733 A * | 8/2016 | ......... G06K 9/00906 |
| CN | 106156757 A * | 11/2016 | |

(Continued)

OTHER PUBLICATIONS

High-speed charge transfer pinnedphotodiode for a CMOS time-of-flight range image sensor, Takeshita et al., SPIE, 2010, pp. 1-10 (Year: 2010).*

(Continued)

*Primary Examiner* — Jayesh A Patel
(74) *Attorney, Agent, or Firm* — Wolf, Greenfield & Sacks, P.C.

(57) ABSTRACT

[Object] To provide the identification device that performs identification accurately without being affected by variations in ambient light and an electronic device.
[Solution] Provided is an identification device including: a direct reflected light information calculation unit configured to calculate, on the basis of sensing data by a TOF sensor that applies light to an object to detect the light, direct reflected light information about direct reflected light from the object; an object detection unit configured to detect the object on the basis of the direct reflected light information;

(Continued)

and an object identification unit configured to identify the object on the basis of the direct reflected light information about the object detected.

19 Claims, 18 Drawing Sheets

(51) Int. Cl.
*G06T 7/50* (2017.01)
*G01S 17/894* (2020.01)
*G06K 9/62* (2022.01)
*G06V 10/24* (2022.01)

(52) U.S. Cl.
CPC .............. *G06T 7/50* (2017.01); *G06V 10/242* (2022.01); *G06V 40/166* (2022.01); *G06T 2207/30201* (2013.01); *G06V 40/171* (2022.01)

(58) Field of Classification Search
CPC ............................... G01S 17/894; G06T 7/50; G06T 2207/30201
See application file for complete search history.

(56) References Cited

U.S. PATENT DOCUMENTS

| | | | |
|---|---|---|---|
| 11,176,392 B2 * | 11/2021 | Yoo | G06V 40/45 |
| 2007/0050639 A1 * | 3/2007 | Nakano | G06V 40/171 713/186 |
| 2007/0146539 A1 | 6/2007 | Kawahara et al. | |
| 2009/0210193 A1 * | 8/2009 | Nagase | F24F 11/30 702/152 |
| 2011/0051119 A1 * | 3/2011 | Min | G01S 17/36 356/5.1 |
| 2011/0304842 A1 * | 12/2011 | Kao | G01S 17/894 356/5.01 |
| 2011/0317878 A1 * | 12/2011 | Kang | G01S 17/10 382/106 |
| 2012/0044093 A1 * | 2/2012 | Pala | G01S 7/4863 340/963 |
| 2012/0134537 A1 * | 5/2012 | Yoon | G06T 7/593 382/103 |
| 2012/0269384 A1 * | 10/2012 | Jones | G06V 20/64 382/103 |
| 2016/0124089 A1 * | 5/2016 | Meinherz | G01S 17/86 356/5.01 |
| 2017/0090032 A1 * | 3/2017 | Ridderbusch | G01S 17/10 |
| 2017/0212226 A1 * | 7/2017 | Broers | G01S 17/894 |
| 2018/0278910 A1 * | 9/2018 | Schoenberg | G01S 11/00 |
| 2019/0294019 A1 * | 9/2019 | Park | G02F 1/0102 |

FOREIGN PATENT DOCUMENTS

| | | | | |
|---|---|---|---|---|
| CN | 106996922 A | * | 8/2017 | |
| EP | 1821524 A1 | | 8/2007 | |
| FR | 3037690 A1 | * | 12/2016 | ........... G06K 9/0012 |
| JP | 2006-155422 A | | 6/2006 | |
| JP | 2007-004321 A | | 1/2007 | |
| JP | 2013-078433 A | | 5/2013 | |
| JP | 5512675 B2 | * | 6/2014 | ........... H04N 5/2226 |
| KR | 20040042501 A | * | 5/2004 | |
| WO | WO-2017057061 A | * | 4/2017 | ............... G08G 1/16 |

OTHER PUBLICATIONS

A Time-Of-Flight Depth Sensor—System Description, Issues and Solutions, S. Burak Gokturk et al., IEEE, 2004, pp. 1-9 (Year: 2004).*
4D photogeometric Face recognition with Time of Flight sensors, Sebastian Bauer et al., IEEE, 2010, pp. 196-203 (Year: 2010).*
Depth Errors Analysis and Correction for Time-of-Flight (ToF) Cameras, Ying He et al., Sensors, 2017, pp. 1-18 (Year: 2107).*
International Written Opinion and English translation thereof dated Nov. 27, 2018 in connection with International Application No. PCT/JP2018/030715.
Partial Extended European Search Report dated Feb. 27, 2020 in connection with European Application No. 18869326.1.
International Preliminary Report on Patentability and English translation thereof dated Apr. 30, 2020 in connection with International Application No. PCT/JP2018/030715.
Extended European Search Report dated Jul. 2, 2020 in connection with European Application No. 18869326.1.
Bauer et al., 4D photogeometric face recognition with time-of-flight sensors. IEEE Workshop on Applications of Computer Vision (WACV) Jan. 5, 2011:196-203.
Buttgen et al., Robust optical time-of-flight range imaging based on smart pixel structures. IEEE Transactions on Circuits and Systems I: Regular Papers. Jul. 1, 2008;55(6):1512-25.
Kaufmann et al., A time-of-flight line sensor: development and application. Proceedings of SPIE. Sep. 1, 2004; 5459. 8 Pages.
Nanda et al., Visual tracking using depth data. Conference on Computer Vision and Pattern Recognition Workshop Jun. 27, 2004. 5 pages.
Tsukada, 2D-3D Face Authentication System Using Distance Image Camera. Automatic Recognition Monthly. May 10, 2014;27(6):30-35.
International Search Report and English translation thereof dated Nov. 27, 2018 in connection with International Application No. PCT/JP2018/030715.
Tsukada, 2D-3D Face Authentication System Using Distance Image Camera. Automatic Recognition Monthly. 2014;27(6):30-35.

* cited by examiner

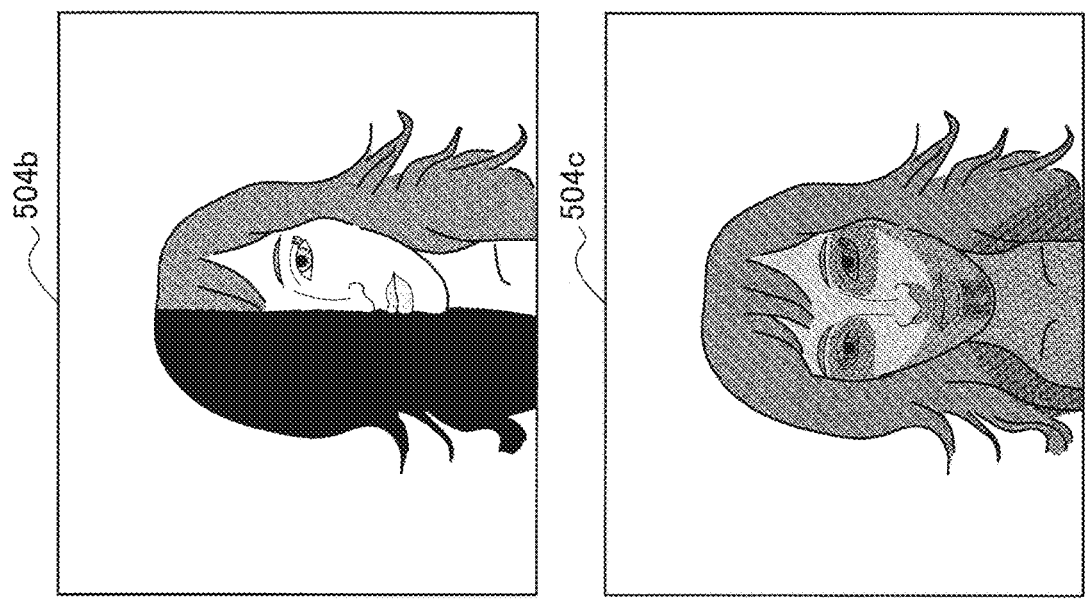
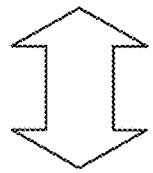
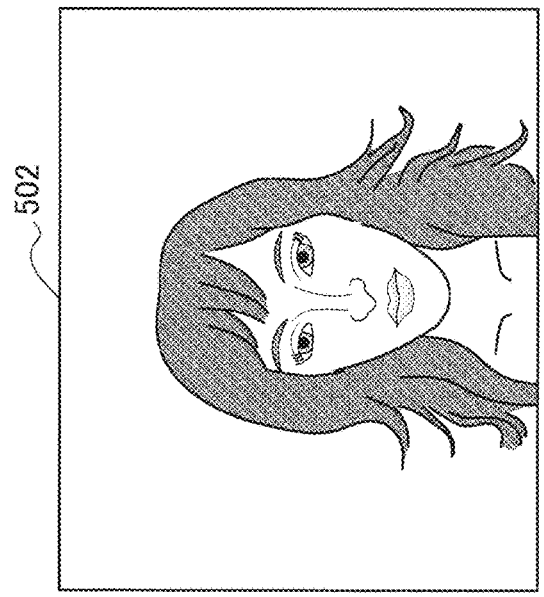
FIG. 1

FIG. 2
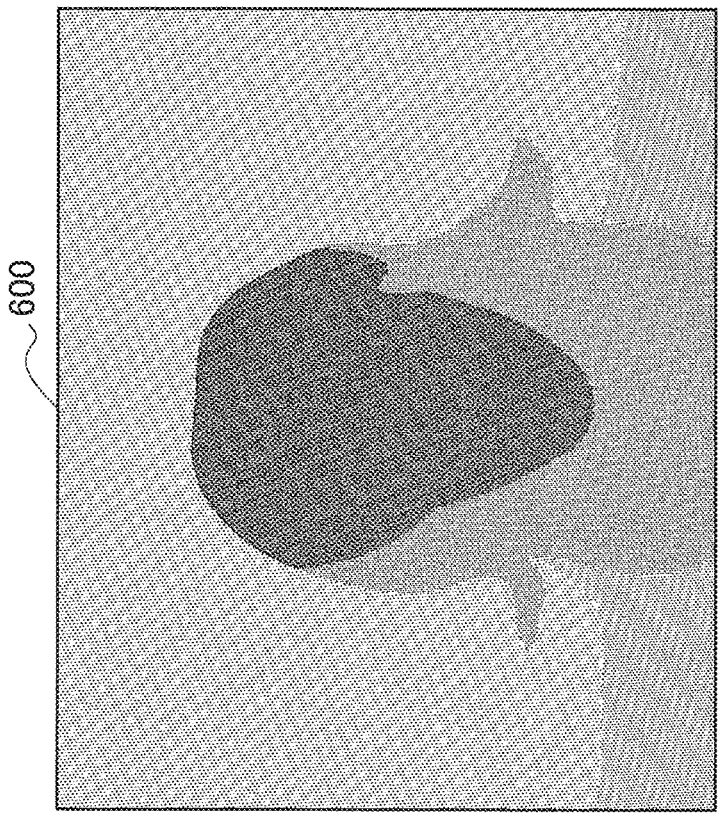
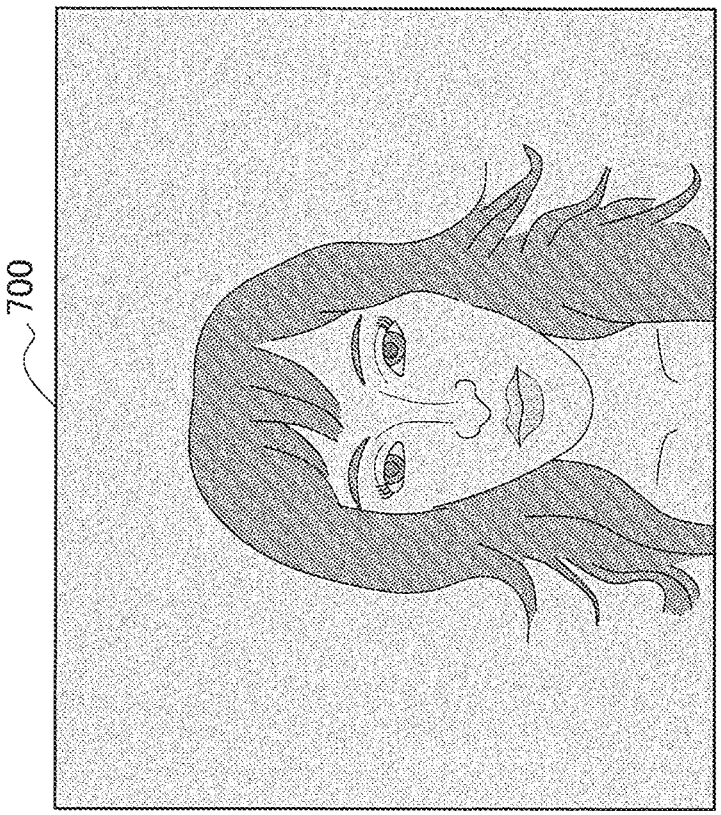

OBJECT IDENTIFICATION ELECTRONIC DEVICE

CROSS-REFERENCE TO RELATED APPLICATIONS

This is a U.S. National Stage Application under 35 U.S.C. § 371, based on International Application No. PCT/JP2018/030715, filed in the Japanese Patent Office as a Receiving Office on Aug. 21, 2018, entitled "IDENTIFICATION DEVICE AND ELECTRONIC DEVICE," which claims priority under 35 U.S.C. § 119(a)-(d) or 35 U.S.C. § 365(b) to Japanese Patent Application Number JP2017-201524, filed in the Japanese Patent Office on Oct. 18, 2017, each of which is hereby incorporated by reference in its entirety.

TECHNICAL FIELD

The present disclosure relates to an identification device and an electronic device.

BACKGROUND ART

In recent years, more and more electronic devices such as smartphones have mounted an identification device thereon in order to enhance the security of the electronic devices. In particular, the identification device captures a face image of a person who intends to use such an electronic device to perform verification, and permits only a person who has been identified as a user of the electronic device to use the electronic device.

For example, Patent Literature 1 below discloses an identification device that registers a face image of a user in advance and compares a face image newly captured with the registered face image. In Patent Literature 1, the accuracy of identification is enhanced by controlling lighting so that the new face image is captured under the same lighting conditions as lighting conditions for the case where the registered face image has been captured.

CITATION LIST

Patent Literature

Patent Literature 1: JP 2017-027492A

DISCLOSURE OF INVENTION

Technical Problem

As described above, for enhancement of the accuracy of identification, it is desirable to capture a new face image under ambient light of the same state as ambient light under which the registered face image has been captured. However, the ambient light tends to vary, and in certain situations, image capturing is difficult by reproducing ambient light of the same state as ambient light under which the registered face image has been captured.

In view of this, the present disclosure proposes a new and improved identification device that performs identification accurately without being affected by variations in ambient light and an electronic device.

Solution to Problem

According to the present disclosure, there is provided an identification device including: a direct reflected light information calculation unit configured to calculate, on the basis of sensing data by a TOF sensor that applies light to an object to detect the light, direct reflected light information about direct reflected light from the object; an object detection unit configured to detect the object on the basis of the direct reflected light information; and an object identification unit configured to identify the object on the basis of the direct reflected light information about the object detected.

In addition, according to the present disclosure, there is provided an identification device including: a distance information calculation unit configured to calculate, on the basis of sensing data by a TOF sensor that applies light to an object to detect the light, distance information about the object; an object detection unit configured to detect the object on the basis of the distance information; and an object identification unit configured to identify the object on the basis of the distance information about the object detected.

Furthermore, according to the present disclosure, there is provided an electronic device having an identification device mounted on the electronic device. The identification device includes a direct reflected light information calculation unit configured to calculate, on the basis of sensing data by a TOF sensor that applies light to an object to detect the light, direct reflected light information about direct reflected light from the object, an object detection unit configured to detect the object on the basis of the direct reflected light information, and an object identification unit configured to identify the object on the basis of the direct reflected light information about the object detected.

Advantageous Effects of Invention

As described above, according to the present disclosure, the identification device that performs identification accurately without being affected by variations in ambient light and an electronic device can be provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram for illustrating an identification method by an identification device of a comparative example.

FIG. 2 is an explanatory diagram for illustrating an image used in an identification device according to an embodiment of the present disclosure.

MODE(S) FOR CARRYING OUT THE INVENTION

Figure 3:
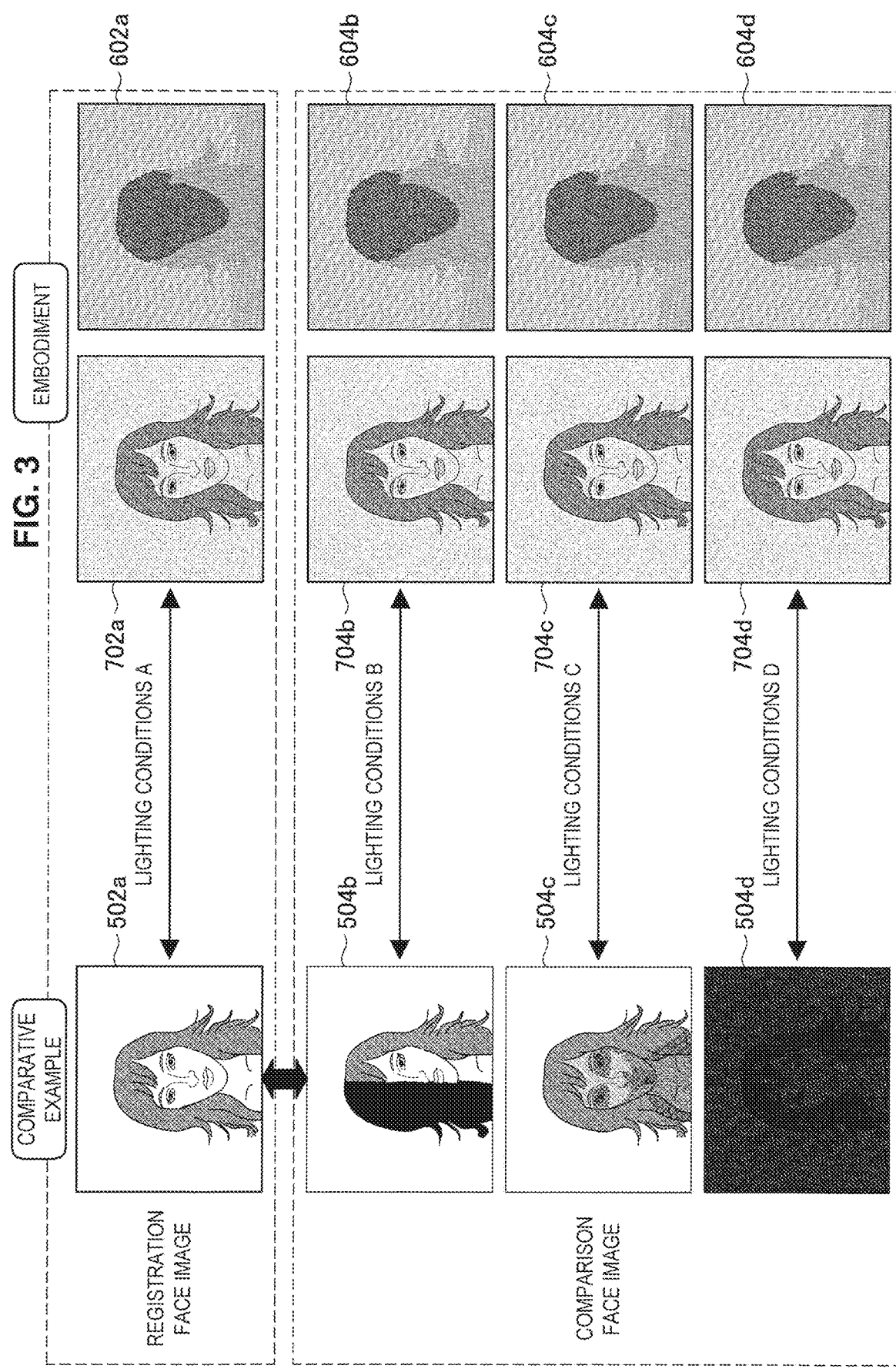
FIG. 3 is an explanatory diagram for illustrating a difference between an identification method according to an embodiment of the present disclosure and an identification method of a comparative example.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in the present specification and the drawings, structural elements that have substantially the same or similar function and structure are sometimes distinguished from each other using different numbers after the same reference sign. However, when there is no need in particular to distinguish structural elements that have substantially the same or similar function and structure, the same reference sign alone is attached. Further, there are cases in which similar structural elements of different embodiments are distinguished by adding the same reference numeral followed by different letters. However, in a case where it is not necessary to particularly distinguish each of similar structural element, only the same reference signs are attached.

The description will be given in the following order.
1. Background in which the Present Inventor Creates Embodiments According to the Present Disclosure
2. Outline of Embodiments of the Present Disclosure
3. First Embodiment
  3.1 Outline of Identification System 10 According to the First embodiment
  3.2 Detailed Configuration of TOF Sensor 100
  3.3 Detailed Configuration of Processing Unit 200
  3.4 Identification Method
  3.4.1 Registration Stage
  3.4.2 Identification Stage
4. Second Embodiment
  4.1 Identification Method
    4.1.1 Registration Stage
    4.2.2. Identification Stage
5. Third Embodiment
6. Fourth Embodiment
7. Summary
8. Supplement 1. Background in which the Present Inventor Creates Embodiments According to the Present Disclosure Next, the background in which the present inventor creates the embodiments according to the present disclosure is described with reference to FIG. 1 before the embodiments according to the present disclosure are detailed. FIG. 1 is an explanatory diagram for illustrating an identification method by an identification device of a comparative example. The comparative example herein means an identification device or identification method that the present inventor had continued to investigate until the present inventor created the embodiments according to the present disclosure.

In the identification device according to the comparative example, a face image of a specific person is registered beforehand, and a face image newly captured is compared with the face image that has been registered beforehand; thereby, identification is performed on a person whose face image is newly captured. However, in the identification device according to the comparative example, the result of the comparison sometimes shows that the person whose face image is newly captured is another person even though the person whose face image is newly captured is actually the same person as the specific person, which limits improvement in the accuracy of identification.

The following specifically describes, with reference to FIG. 1, the incorrect identification as described above by the identification device according to the comparative example. Here, a case is considered in which the identification device according to the comparative example uses a registration face image 502 as shown on the left side of FIG. 1 for comparison. In this case, the identification device according to the comparative example newly captures a face image of a person to obtain a comparison face image 504, and compares the newly obtained comparison face image 504 with the registration face image 502.

For example, in a case where the identification device according to the comparative example captures an image of the same person as the person corresponding to the registration face image 502 under lighting conditions different from lighting conditions at the time of the image capturing of the registration face image 502, a comparison face image 504b or 504c as shown on the right side of FIG. 1 is obtained in some cases. To be specific, at the time of the image capturing of the registration face image 502, light falls on the front of the face of the person (forward light), so that the registration face image 502 is a clear image over the whole face as shown on the left side of FIG. 1. On the other hand, at the time of the image capturing of the comparison face image 504b, light falls only on the left half of the face of the person, so that the comparison face image 504b has a large shadow difference in the image as shown on the upper right of FIG. 1, and particularly, the comparison face image 504b is an image in which a half of the face is clear and the other half is unclear. Further, at the time of the image capturing of the comparison face image 504c, light is not enough to fall on the whole face of the person, so that the comparison face image 504c is an unclear image over the whole face as shown on the lower right of FIG. 1.

In other words, unlike the registration face image 502, the entirety or a part of the comparison face images 504b and 504c is an unclear image. Thus, in a case where the registration face image 502 and the comparison face images 504b and 504c are used for comparison, the identification device according to the comparative example sometimes determines that the images 502, 504b, and 504c are face images of different persons even though the images 502, 504b, and 504c are face images of the same person. Consequently, the identification device according to the comparative example fails to identify the person as the same person.

The reason why the identification device according to the comparative example performs the incorrect identification is that the lighting conditions at the time of the image capturing of the registration face image 502 are different from the lighting conditions at the time of the image capturing of the comparison face image 504, so that the face images of different states are captured even though the face images are face images of the same person. Thus, it can be said that, in the identification device according to the comparative example, the accuracy of identification is easily influenced (affected) by variations in lighting conditions (ambient light) at the time of the image capturing.

In view of this, in the identification device disclosed in Patent Literature 1 above, lighting is so controlled as to make the lighting conditions at the time of the image capturing of the comparison face image 504 the same as the lighting conditions at the time of the image capturing of the registration face image 502. This enables, at the time of the image capturing of the comparison face image 504, setting of the same lighting conditions as the lighting conditions at the time of the image capturing of the registration face image 502, so that face images substantially the same as (substantially equal to) each other are captured for the same person. Thus, in the identification device disclosed in Patent Literature 1 above, the probability of obtaining a result of identifying the person as the same person is increased, resulting in improvement in the accuracy of identification.

In particular, according to Patent Literature 1 above, the lighting conditions at the time of the image capturing of the registration face image 502 are estimated, and the lighting is so controlled as to make the lighting conditions at the time of the image capturing of the comparison face image 504 the same as the lighting conditions at the time of the image capturing of the registration face image 502. However, it is difficult to control the lighting conditions so as to become stable desired lighting conditions due to the influence of variations, for example, in sunlight in outdoors or the like. Further, since the lighting conditions at the time of the image capturing of the registration face image 502 are estimated and the lighting is controlled, it is difficult, in Patent Literature 1 above, to avoid longer processing time and an increase in power consumption, and also difficult to avoid the increasing complexities of the configuration of the identification device and an increase in manufacturing cost.

In view of the foregoing situation, the present inventor has conceived of identification using distance information (2.5-dimensional information or three-dimensional information) indicating the depth information of a subject (object) instead of a two-dimensional image (for example, color images such as the registration face image 502 and the comparison face image 504, or an infrared light image) that is easily influenced by variations in ambient light. Note that the 2.5-dimensional information herein is information generated by linking distance information (depth information) obtained for each pixel of a TOF sensor, described later, with position information of the corresponding pixel. In addition, the three-dimensional information herein is three-dimensional coordinate information in the real space (in particular, an aggregation of a plurality of pieces of three-dimensional coordinate information) generated by converting the position information of the pixel of the 2.5-dimensional information to coordinates in the real space to link the corresponding distance information with the coordinates obtained by the conversion.

One of methods for obtaining the distance information is a method with a stereo camera. The stereo camera captures images with two cameras and obtains distance information about distance to a subject using parallax of the cameras. However, it is difficult to prevent the stereo camera from having a large structure due to the use of the two cameras. In addition, according to the investigation by the present inventor, the stereo camera has a difficulty in obtaining distance information about a uniform surface with no patterns, for example, a difficulty in obtaining distance information about a skin area with few patterns such as a face. In addition, the accuracy of the distance information with the stereo camera is easily influenced by variations in ambient light.

Another method for obtaining the distance information is a structured light method. The structured light method is a method of estimating a distance to a subject by projecting light having a predetermined pattern onto a surface of the subject to analyze deformation of the pattern of the light projected onto the subject. It can be said that the structured light method is less likely to be influenced by variations in ambient light as compared to the comparative example; however, completely canceling the influence of variations in ambient light is difficult in the structured light method. Further, in the structured light method, an image of the subject onto which the predetermined pattern is being projected is captured. In a case where such an image is used for identification of a person or the like, improving the accuracy of identification is difficult because of the influence of the projected pattern.

Another method for obtaining the distance information is a method of capturing images of a subject continuously with a camera moving around the subject to obtain a plurality of captured frames of the subject and calculating distance information of the subject on the basis of the plurality of captured frames thus obtained. With this method, however, canceling the influence of variations in ambient light is difficult. Further, the method is time-consuming in order to obtain a plurality of captured frames. Further, with this method, movement of the subject or change in the outline of the subject does not allow the calculation of distance information. The method is therefore difficult to be used in an identification device for identifying a person or the like.

It is also presumably possible to use simultaneously, for identification, both a camera for capturing a two-dimensional image as described in the comparative example and a camera for obtaining distance information as described above. In this case, however, it is difficult to prevent the identification device from having a large structure due to the use of the plurality of cameras.

To address this, the present inventor has invented, on the basis of the investigation described above, an identification device according to embodiments of the present disclosure which can perform identification accurately without being affected by variations in ambient light. The following describes, one by one, the details of the embodiments of the present disclosure invented by the present inventor.

2. Outline of Embodiments of the Present Disclosure

First, the outline of the embodiments of the present disclosure is described with reference to FIG. 2 and FIG. 3. FIG. 2 is an explanatory diagram for illustrating an image used in an identification device according to an embodiment of the present disclosure. FIG. 3 is an explanatory diagram for illustrating a difference between an identification method according to an embodiment of the present disclosure and an identification method of the comparative example.

The present inventor conceived, on the basis of the investigation above, that distance information and the like are obtained using a time of flight (TOF) sensor and identification is performed on the basis of the obtained distance information and the like. The TOF sensor, for example, applies irradiation light having a predetermined period to a subject, detects the light (reflected light) reflected from the subject, and detects a time difference or a phase difference between the irradiation light and the reflected light, so that the depth (distance information) of the subject can be obtained. Note that, in the embodiments of the present disclosure created by the present inventor, it is assumed that the TOF sensor is a sensor capable of obtaining the depth of the subject by detecting the phase difference between the irradiation light and the reflected light.

The TOF sensor can obtain the distance information as described above. For example, the TOF sensor according to the embodiments described below can obtain an image 600 (hereinafter referred to as a range image 600) based on distance information of the subject (the face of a person herein) as shown on the right side of FIG. 2. The range image 600 is an image obtained by projecting (by giving color or brightness according to the distance information), onto a plane, 2.5-dimensional information obtained by linking the distance information that is obtained on the basis of reflected light reflected from the face of the person with position information of a pixel of the TOF sensor. Since the distance information is obtained as a constant value even though the ambient light varies, the distance information can be said to be information which is unaffected by variations in ambient light. Note that the range image 600 may be an image obtained by projecting the three-dimensional information onto a plane.

Further, since the TOF sensor can apply light (for example, infrared light) to a subject and detect the light reflected from the subject, an image (for example, an infrared image) based on the detected reflected light can be also obtained at the same time with the range image 600. Specifically, the TOF sensor according to the embodiments can also obtain an image 700 (hereinafter referred to as a direct reflected light image 700) based on direct reflected light information of a subject (the face of a person herein) as shown on the left side of FIG. 2. The direct reflected light image 700 is an image based on the direct reflected light information that is obtained by applying irradiation light to the subject with the TOF sensor to detect reflected light that is directly reflected from the subject. More particularly, the direct reflected light image 700 is an image representing the intensity of light detected by the TOF sensor in gradations as shown on the left side of FIG. 2. However, in the embodiments of the present disclosure created by the present inventor, the direct reflected light image 700 is similar to the registration face image 502 or the comparison face image 504 (see FIG. 1) of the comparative example described above. The direct reflected light image 700 is, however, substantially different from the comparative example in that the direct reflected light image 700 is an image that has been subjected to processing of canceling the influence of ambient light on information about the light detected by the TOF sensor (sensing data). As can be seen from the fact that the influence of ambient light is canceled, the direct reflected light image 700 can be said to be an image which is unaffected by variations in ambient light. In other words, the present inventor originally conceived of identification using the direct reflected light image 700 based on the information (direct reflected light information) that is obtained after processing of canceling the influence of ambient light is performed on the sensing data of the TOF sensor. Note that the cancellation of the influence of ambient light in the embodiments of the present disclosure created by the present inventor is detailed later.

Further, the range image 600 and the direct reflected light image 700 can be simultaneously obtained with one shot by the TOF sensor according to the embodiments. Therefore, in the embodiments, there is no need to capture a plurality of image frames in order to, for example, obtain two images, which prevents an increase in time for identification. In addition, since the TOF sensor according to the embodiments applies light to the subject, it is possible to identify the subject even in the dark or the like in the embodiments. Note that the range image 600 and the direct reflected light image 700 shown in FIG. 2 are merely examples, and the range image 600 and the direct reflected light image 700 according to the embodiments are not limited to the examples in FIG. 2.

As described above, in the embodiments of the present disclosure created by the present inventor, at least one piece of the distance information (range image 600) or the direct reflected light information (direct reflected light image 700), which is less likely to be influenced by variations in ambient light, is used to perform identification, so that identification can be performed accurately without being affected by variations in ambient light.

Specifically, with reference to FIG. 3, the identification method according to an embodiment of the present disclosure is described in comparison with the identification method of the comparative example. In particular, a registration face image 502*a* in the identification method according to the comparative example is shown in the upper left part of FIG. 3, and the comparison face images 504*b*, 504*c*, and 504*d* in the identification method according to the comparative example are shown in the lower left part of FIG. 3. Further, registration range image 602*a* and registration direct reflected light image 702*a* in the identification method according to this embodiment are shown in the upper right part of FIG. 3. In addition, comparison range images 604*b*, 604*c*, and 604*d* and comparison direct reflected light images 704*b*, 704*c*, and 704*d* in the identification method according to this embodiment are shown in the lower right part of FIG. 3. Note that it is assumed that all of the images shown in FIG. 3 are face images of the same person. Further, as shown in the middle of FIG. 3, it is assumed that the registration face image 502*a*, the registration range image 602*a*, and the registration direct reflected light image 702*a* are images captured under lighting conditions A. In addition, it is assumed that the comparison face image 504, the comparison range image 604, and the comparison direct reflected light image 704 are images captured under lighting conditions B, C, and D, which are different from one another and also different from the lighting conditions A.

As shown on the left side of FIG. 3, in the comparative example, it can be seen that a change in lighting conditions makes the comparison face images 504b, 504c, and 504d different from the registration face image 502a. Specifically, in the comparison face image 504b, a half of the face is clear and the other half is unclear. The comparison face image 504c is an unclear image over the whole face, in other words, an image hard to be recognized as a face image. Accordingly, in the comparative example, a change in lighting conditions, i.e., a change in ambient light, causes a change in the state of the image. This makes the comparison face image 504 substantially different from the registration face image 502a even though both the images are face images of the same person, which makes it difficult to identify the person as the same person. This is because, in the comparative example, not only light directly reflected from the subject but also indirect light of lighting or the like (indirect reflected light), that is, ambient light, is also detected simultaneously, and an image of the subject is captured, so that the influence of ambient light on the image is unavoidable.

In contrast, in the embodiment of the present disclosure, as shown on the right side of FIG. 3, even in a case where the lighting conditions change, the comparison range images 604b, 604c, and 604d and the comparison direct reflected light images 704b, 704c, and 704d are images substantially the same as (substantially equal to) the registration range image 602a and the registration direct reflected light image 702a. In other words, in this embodiment, the state of the image does not change even in a case where the lighting conditions, i.e., ambient light, varies. In this embodiment, therefore, even in a case where the lighting conditions, i.e., ambient light, varies, change in the state of the image is small in the case of the same person, which enables identification of the person as the same person.

According to the embodiments of the present disclosure, it is thus possible to perform identification with high accuracy without being affected by variations in ambient light. Hereinafter, the embodiments of the present disclosure are detailed one by one. In the embodiments of the present disclosure described below, it is assumed that identification is performed using both the distance information and the direct reflected light information (specifically, both the range image 600 and the direct reflected light image 700). In the embodiments, however, the identification is not limited to the identification using both the distance information and the direct reflected light information, but identification using at least one piece of the distance information or the direct reflected light information is also possible.

3. First Embodiment

<3.1 Outline of Identification System 10 According to the First Embodiment>

Figure 4:
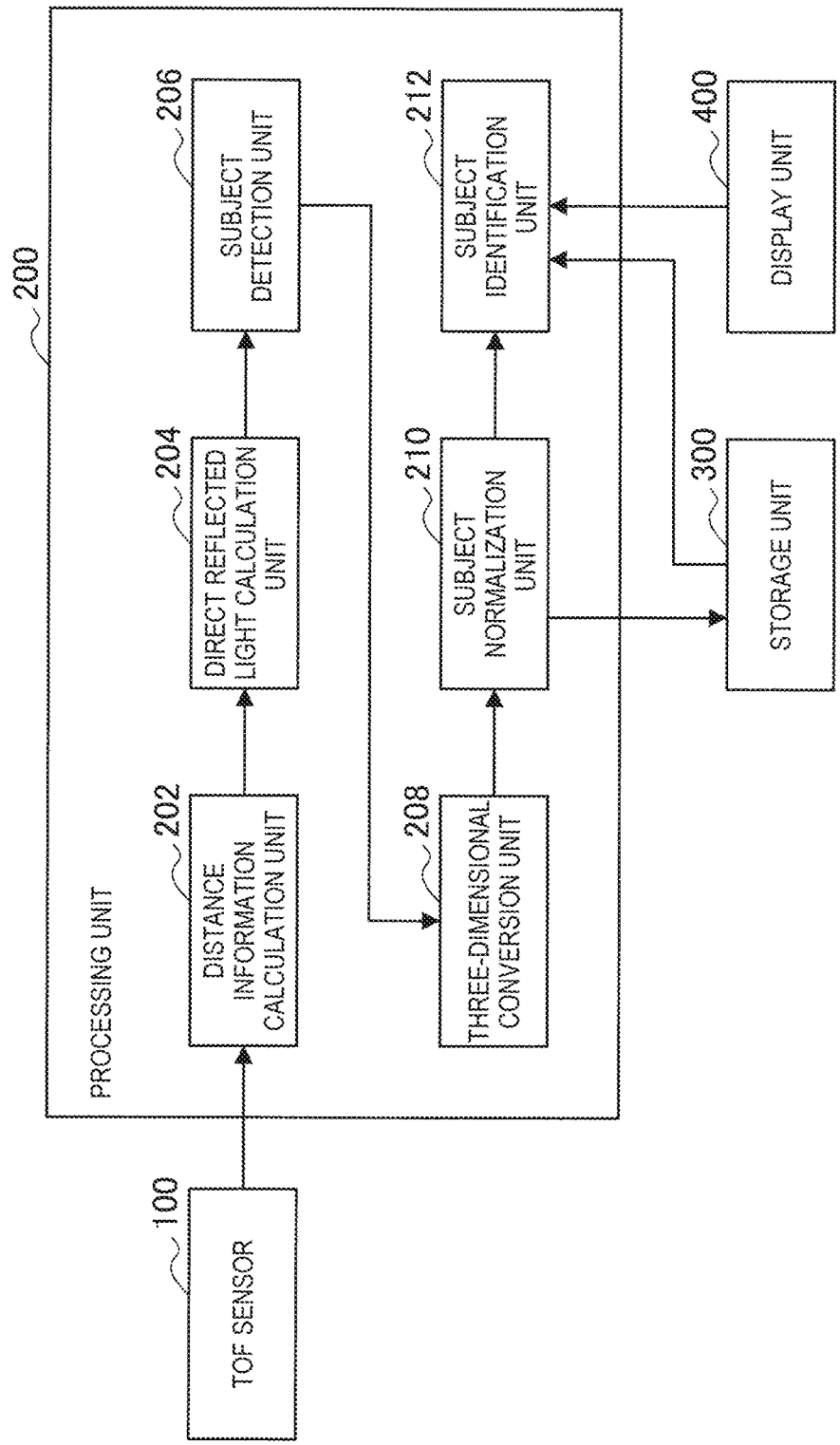
FIG. 4 is a block diagram showing a configuration example of an identification system 10 according to a first embodiment of the present disclosure.

First, the outline of the identification system (identification device) 10 according to the first embodiment of the present disclosure is described with reference to FIG. 4. FIG. 4 is a block diagram showing a configuration example of the identification system 10 according to this embodiment. As shown in FIG. 4, the identification system 10 according to this embodiment mainly includes a TOF sensor 100, a processing unit 200, a storage unit 300, and a display unit 400. The following describes an outline of each of the devices included in the identification system 10 according to this embodiment.

(TOF Sensor 100)

The TOF sensor 100 obtains sensing data for obtaining distance information and direct reflected light information of a subject (specifically, the range image 600 and the direct reflected light image 700 shown in FIG. 2). In particular, the TOF sensor 100 outputs, to the processing unit 200 described later, sensing data that is obtained by applying irradiation light such as infrared light to the subject (object) and detecting, for example, direct reflected light which is reflected from the subject. The processing unit 200 can obtain the distance information (depth) of the subject by calculating a phase difference between the irradiation light and the reflected light on the basis of the sensing data. In addition, the processing unit 200 can also obtain the direct reflected light information of the subject by processing the sensing data. Note that the method for obtaining the distance information using the phase difference as described above is called an indirect TOF method. The TOF sensor 100 is detailed later.

Note that, in this embodiment, since one TOF sensor 100 is used instead of a plurality of cameras, the increasing size of the identification system 10 or the increasing complexities thereof can be avoided. This avoids an increase in manufacturing cost of the identification system 10.

(Processing Unit 200)

The processing unit 200 mainly includes a central processing unit (CPU), a random access memory (RAM), and a read only memory (ROM). The processing unit 200 can store, into the storage unit 300 described later, a registration image (specifically, registration range image 602, registration direct reflected light image 702, or the like), identify a person by using the registration image stored in the storage unit 300, and so on. Note that the processing unit 200 is detailed later.

(Storage Unit 300)

The storage unit 300 is implemented by a ROM, a RAM, or the like, and stores the registration image used for identification as described above.

(Display Unit 400)

The display unit 400 is a functional unit that outputs an identification result and so on to a user, and is implemented by, for example, a liquid crystal display (LCD) device, an organic light emitting diode (OLED) device, or the like. For example, in a case where a face image of a person newly captured matches the registration image stored in the storage unit 300, the display unit 400 displays information such as the name of a person who is linked with the registration image. On the other hand, in a case where the face image of the person newly captured does not match the registration image, the display unit 400 displays the fact that there is no match therebetween.

Note that, in this embodiment, a part or all of the TOF sensor 100, the processing unit 200, the storage unit 300, and the display unit 400 may be provided as a single unit. For example, in a case where the TOF sensor 100, the processing unit 200, the storage unit 300, and the display unit 400 are provided as a single unit, the single unit is operable to perform processing related to identification as a stand-alone device. In addition, the processing unit 200 may be constructed by a system including a plurality of devices on the premise of connection to a network such as cloud computing, for example.

<3.2 Detailed Configuration of TOF Sensor 100>

Figure 5:
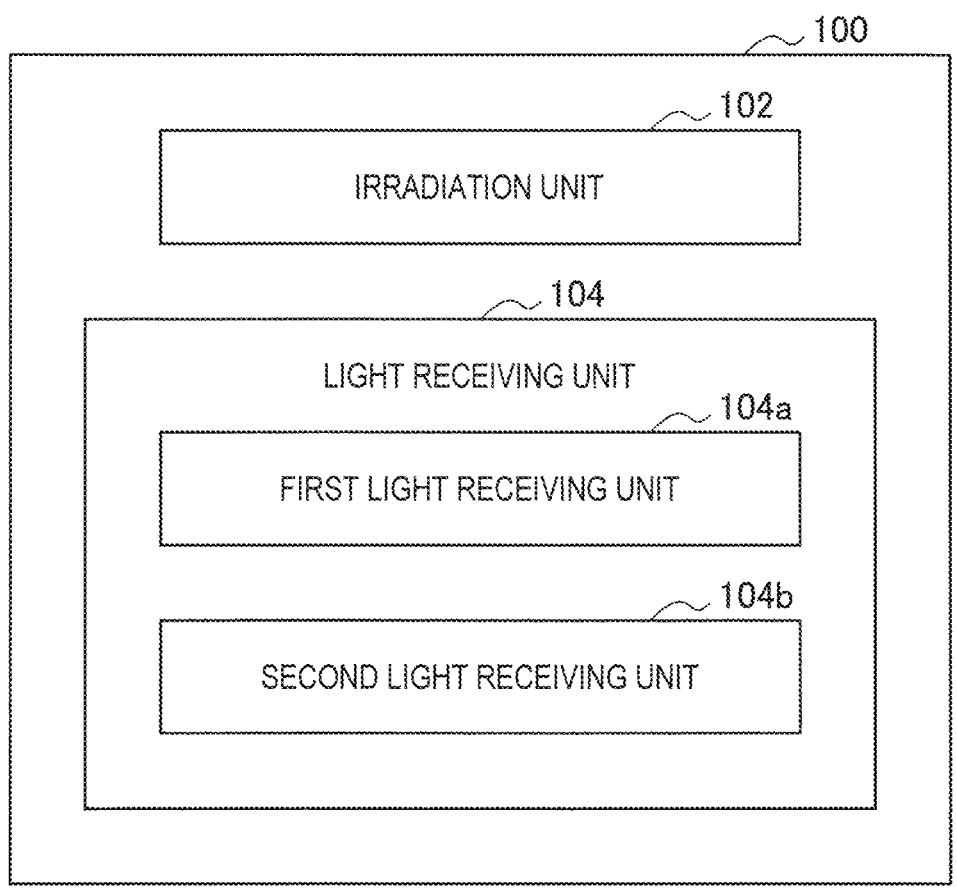
FIG. 5 is a block diagram showing a configuration example of a TOF sensor 100 according to the first embodiment.

The outline of the identification system 10 according to this embodiment is described above. Next, the detailed configuration of the TOF sensor 100 according to this embodiment is described with reference to FIG. 5. FIG. 5 is a block diagram showing a configuration example of the TOF sensor 100 according to this embodiment. As shown in FIG. 5, the TOF sensor 100 mainly includes an irradiation unit 102 and a light receiving unit 104. Each of the functional units of the TOF sensor 100 is detailed below.

(Irradiation Unit 102)

The irradiation unit 102 has a laser light source (not shown) and an optical element (not shown). The laser light source is a laser diode for example, and the laser light source can change a wavelength of light to be applied by appropriately selecting the laser diode. Note that the description of this embodiment takes an example of the irradiation unit 102 applying infrared light having a wavelength of, for example, 785 nm or so. In this embodiment, however, the irradiation unit 102 is not limited to application of such infrared light.

(Light Receiving Unit 104)

The light receiving unit 104 includes a condenser lens (not shown) and a light receiving element (not shown). The condenser lens has a function of collecting the received light on the light receiving element. In addition, the light receiving element includes for example, a complementary metal oxide semiconductor (CMOS) image sensor having a plurality of pixels, generates, for each pixel, a light receiving signal on the basis of the intensity of the received light, and outputs the generated light receiving signal to the processing unit 200.

Note that the processing unit 200 may control the irradiation unit 102 and the light receiving unit 104 of the TOF sensor 100. Alternatively, a control unit (not shown) provided in the TOF sensor 100 may control the irradiation unit 102 and the light receiving unit 104.

Figure 6:
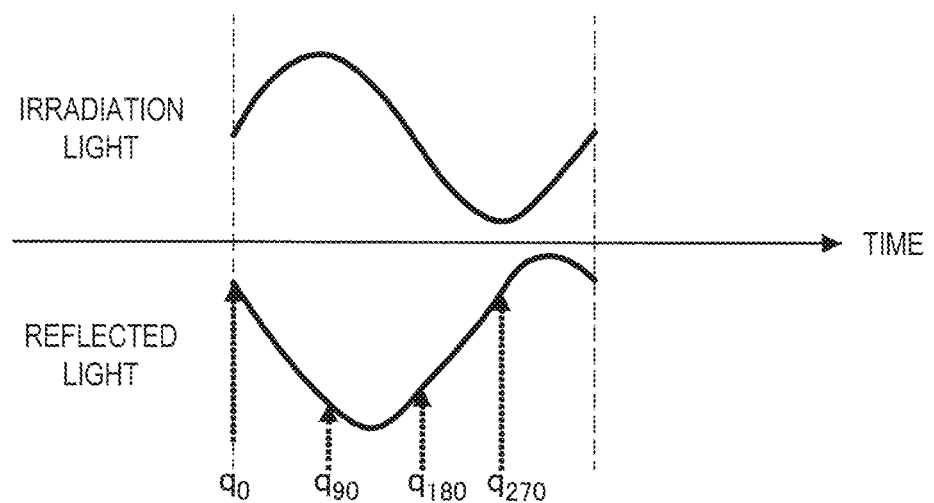
FIG. 6 is an explanatory diagram for illustrating the principle of a calculation method of distance information.

Here, the principle of a method for calculating the distance information by the TOF sensor 100 is described with reference to FIG. 6. FIG. 6 is an explanatory diagram for illustrating the principle of the method for calculating the distance information. In particular, FIG. 6 schematically shows time variations in intensity of the irradiation light and the reflected light in the TOF sensor 100.

As shown in FIG. 6, the TOF sensor 100 applies light that has been so modulated that the intensity of the light varies periodically from the irradiation unit 102 toward the subject. The applied light is reflected from the subject and is detected as the reflected light by the light receiving unit 104 of the TOF sensor 100. As shown in FIG. 6, the detected reflected light (lower part of FIG. 6) has a phase difference with respect to the irradiation light (upper part of FIG. 6). The phase difference is larger as the distance from the TOF sensor 100 to the subject is longer, and is smaller as the distance from the TOF sensor 100 to the subject is shorter.

In view of this, for example, the TOF sensor 100 senses the intensity of light of four phases (0 degrees, 90 degrees, 180 degrees, 270 degrees) of the reflected light. The sensing data ($q_0$, $q_{90}$, $q_{180}$, $q_{270}$) is substituted into the following mathematical formula (1), so that the phase difference (phase) can be calculated. Further, the phase difference thus calculated and the wavelength (range) of the light are used so that distance information (distance) indicating distance to the subject can be obtained according to the following mathematical formula (1).

[Math. 1]

$$I = q_0 - q_{180}$$
$$Q = q_{90} - q_{270}$$
$$\text{phase} = \tan^{-1}\left(\frac{Q}{I}\right)$$
$$\text{distance} = \frac{\text{phase} \times \text{range}}{2\pi}$$

(1)

Note that, since the distance information can be obtained for each pixel of the light receiving unit 104, the 2.5-dimensional information described above can be obtained by linking the position information of the corresponding pixel with the distance information.

Further, the light receiving unit 104 according to this embodiment has first and second light receiving units 104a and 104b that differ in operation from each other as shown in FIG. 5. In particular, the first and second light receiving units 104a and 104b according to this embodiment have substantially the same (almost the same) characteristics because the first and second light receiving units 104a and 104b are formed simultaneously. Further, it is assumed that, although the first and second light receiving units 104a and 104b operate in a period having the same length, the first and second light receiving units 104a and 104b operate so as to have a phase difference of 180 degrees from each other (see FIG. 7). Note that the TOF sensor 100 having such two light receiving units described above is called a 2-tap TOF sensor.

Figure 7:
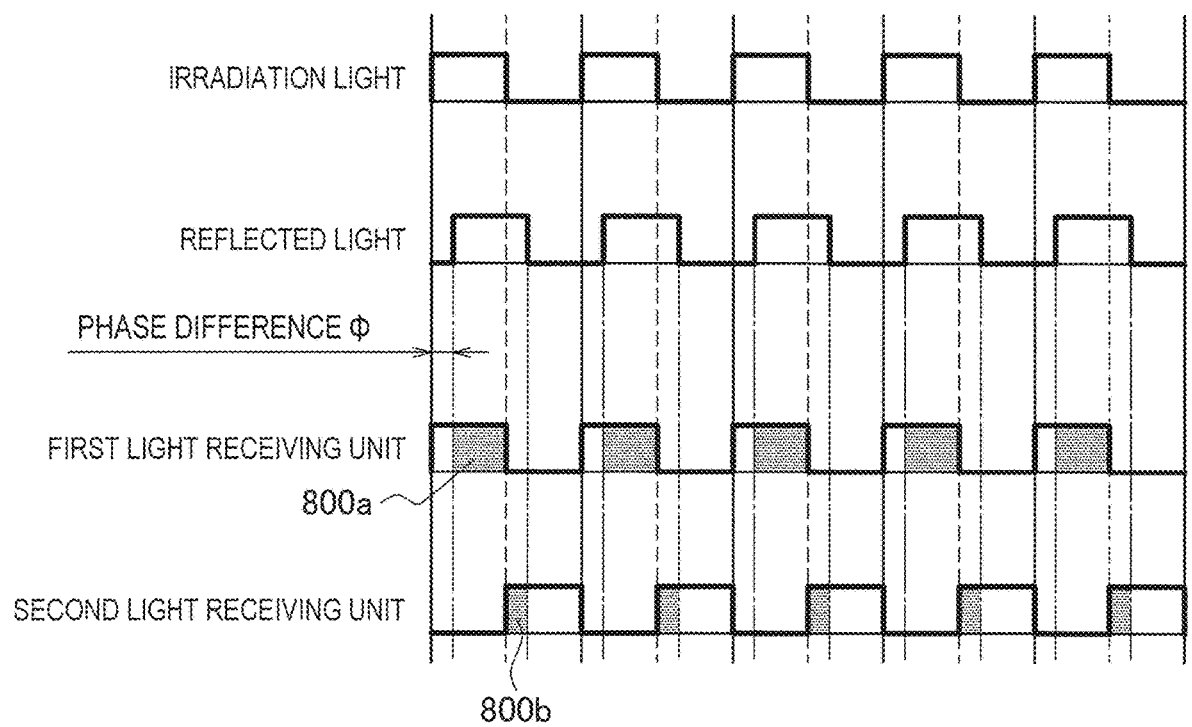
FIG. 7 is an explanatory diagram for illustrating a calculation method of distance information with the TOF sensor 100 according to the first embodiment.

Next, the method for calculating the distance information in the 2-tap TOF sensor 100 according to this embodiment is described with reference to FIG. 7. FIG. 7 is an explanatory diagram for illustrating a calculation method of distance information with the TOF sensor 100 according to this embodiment. In FIG. 7, the irradiation light (the first part in FIG. 7) and the reflected light (the second part in FIG. 7) are shown as pulsed light for easy understanding, and it is assumed that the phase difference between the irradiation light and the reflected light is denoted by cp. Further, FIG. 7 shows the operation of the light receiving unit 104a (the third part in FIG. 7) and the second light receiving unit 104b (the fourth part in FIG. 7), and it is assumed that the light receiving units 104a and 104b operate during a period with a convex upward. Therefore, as shown in FIG. 7, the periods during which the first and second light receiving units 104a and 104b operate do not overlap each other, which shows that the first and second light receiving units 104a and 104b are different in operation from each other.

As shown in FIG. 7, in a case where the reflected light has a phase difference φ with respect to the irradiation light, the first light receiving unit 104a and the second light receiving unit 104b can detect the reflected light in regions 800a and 800b, indicated by gray, of FIG. 7. In particular, the intensity of the light detected by the first and second light receiving units 104a and 104b is integrated separately, so that light receiving signals corresponding to areas of the region 800a and the region 800b of FIG. 7 can be obtained. As apparent from FIG. 7, the difference between the integrated value in the first light receiving unit 104a and the integrated value in the second light receiving unit 104b varies according to the phase difference φ of the reflected light. In this embodiment, therefore, the difference between the integrated values of the first and second light receiving units 104a and 104b can be calculated, the phase difference φ can be calculated on the basis of the calculated difference, and further the distance information can be calculated. Note that, in this embodiment, it is possible to calculate the distance information by calculating the phase difference φ using the ratio of the integrated values instead of using the difference between the integrated values.

In practice, the first and second light receiving units 104a and 104b detect indirect reflected light (ambient light) of lighting or the like at the same time with the reflected light (direct reflected light) directly reflected from the subject. Specifically, the first and second light receiving units 104a and 104b detect light as that shown in the upper part of FIG. 8 which is an explanatory diagram for schematically showing cancellation of ambient light (indirect reflected light) in this embodiment.

Figure 8:
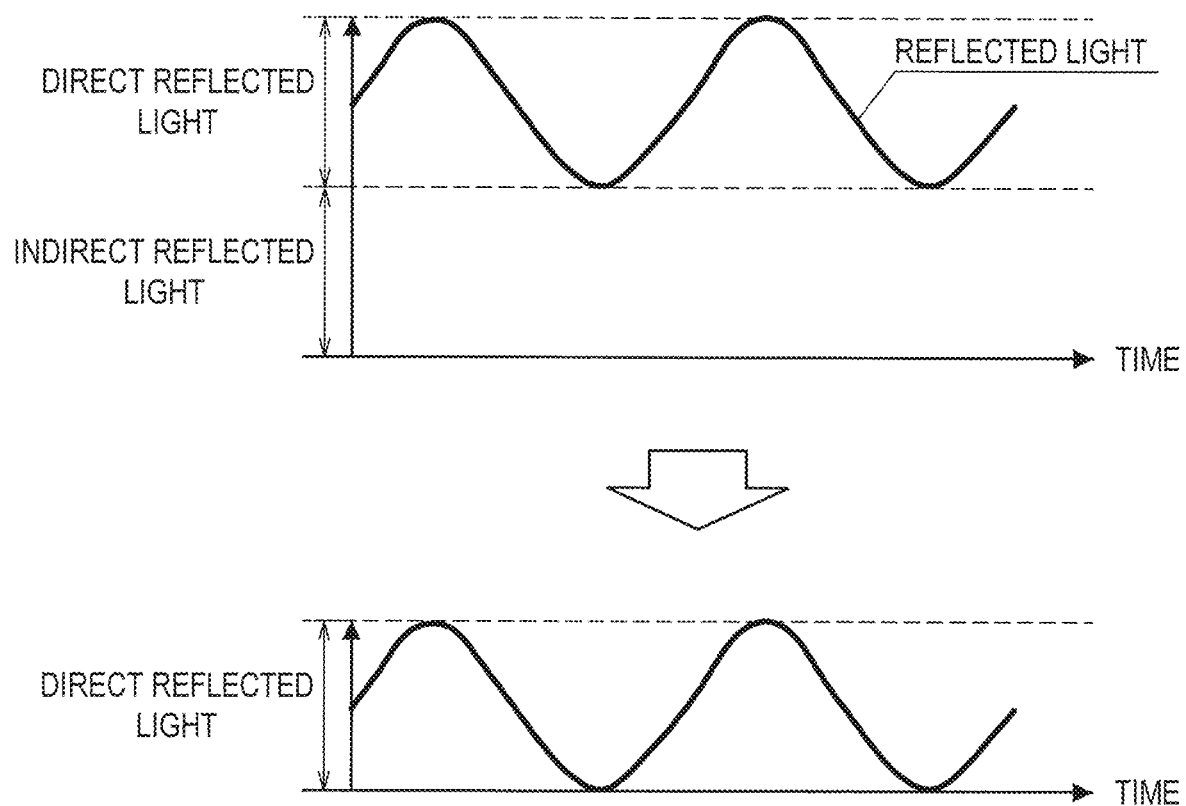
FIG. 8 is an explanatory diagram for schematically showing cancellation of ambient light (indirect reflected light) in the first embodiment.

In view of this, as shown in the upper part of FIG. 8, in a case where the indirect reflected light (ambient light) is regarded as light of which intensity does not vary periodically during a predetermined period, unlike the directly reflect light, both the first light receiving unit 104a and the second light receiving unit 104b detect the indirect reflected light having the same intensity. Thus, a difference between the integrated value of the first light receiving unit 104a and the integrated value of the second light receiving unit 104b is calculated, so that an integrated component due to the intensity of the indirect reflected light common to each other can be cancelled. Thus, only the direct reflected light as shown in the lower part of FIG. 8 can be extracted. In short, in this embodiment, the difference between the integrated value of the first light receiving unit 104a and the integrated value of the second light receiving unit 104b is cancelled, which enables cancellation of the influence of the indirect reflected light (ambient light). According to this embodiment, the direct reflected light information after the cancellation of the indirect reflected light is used, which can obtain the direct reflected light image 700 (see FIG. 2) which is less likely to be influenced by variations in ambient light. Note that this embodiment is not limited to the arrangement in which the difference between the integrated value of the first light receiving unit 104a and the integrated value of the second light receiving unit 104b is calculated and thereby the direct reflected light with the influence of the indirect reflected light canceled is extracted. For example, in this embodiment, it is possible to extract the direct reflected light with the influence of the indirect reflected light canceled by using the ratio of the integrated value of the first light receiving unit 104a and the integrated value of the second light receiving unit 104b.

Note that, since the distance information described above is less likely to be influenced by variations in ambient light, the distance information is not limited to be calculated by using the difference between the integrated values as described above. However, it is preferable that the distance information be calculated by using the difference between the integrated values because a noise signal common to and unique to the first and second light receiving units 104a and 104b can be removed from the distance information.

Further, in this embodiment, the 2-tap TOF sensor 100 is not limited to the TOF sensor having the two light receiving units 14a and 104b. For example, the 2-tap TOF sensor 100 according to this embodiment may be a sensor that has one light receiving unit 104 and two readout units (first readout unit and second readout unit) (not shown) for reading out light that has been received by one light receiving unit 104 at different times. Even the TOF sensor 100 having such one light receiving unit and such two readout units can obtain, as described above, the direct reflected light with the influence of the indirect reflected light canceled and a distance signal from which the noise signal has been removed.

<3.3 Detailed Configuration of Processing Unit 200>

The detailed configuration of the TOF sensor 100 according to this embodiment is described above. Next, the detailed configuration of the processing unit 200 according to this embodiment is described with reference to FIG. 4. As shown in FIG. 4, the processing unit 200 includes a distance information calculation unit 202, a direct reflected light calculation unit (direct reflected light information calculation unit) 204, a subject detection unit (object detection unit) 206, a three-dimensional conversion unit (three-dimensional coordinate calculation unit) 208, a subject normalization unit (normalization processing unit) 210, and a subject identification unit (object identification unit) 212. Each of the functional units of the processing unit 200 is detailed below.

(Distance Information Calculation Unit 202)

As described above, the distance information calculation unit 202 calculates a phase difference between the irradiation light and the reflected light on the basis of the sensing data from the TOF sensor 100, and calculates the distance information (range image 600) of the subject on the basis of the phase difference. The distance information calculated by the distance information calculation unit 202 is information linked with position information of a pixel of the light receiving unit 104 of the TOF sensor 100, and thus it can be said that the distance information is the 2.5-dimensional information described above. Further, the distance information calculation unit 202 can output the calculated distance information to, for example, the subject detection unit 206, the three-dimensional conversion unit 208, and the subject normalization unit 210 which are described later.

(Direct Reflected Light Calculation Unit 204)

The direct reflected light calculation unit 204 uses the method as described above to perform the processing of canceling the indirect reflected light (ambient light) on the sensing data from the TOF sensor 100, and thus calculates the direct reflected light information (direct reflected light image 700) of the subject. Further, the direct reflected light calculation unit 204 can output the calculated direct reflected light information to, for example, the subject detection unit 206 and the subject normalization unit 210 which are described later.

(Subject Detection Unit 206)

The subject detection unit 206 detects a region occupied by the subject (subject region) of the range image 600 based on the distance information obtained by the distance information calculation unit 202 or of the direct reflected light image 700 based on the direct reflected light information obtained by the direct reflected light calculation unit 204. In a case where the subject detection unit 206 detects, as the subject, a region of the face of a person from the range image 600, the subject detection unit 206 can detect the region of the face, for example, on the basis of a predetermined contour line (contour of the face). In a case where the subject detection unit 206 detects the region of the face of the person from the direct reflected light image 700, the subject detection unit 206 can detect the region of the face, for example, on the basis of the positional relationship of predetermined feature points (eyes, nose, mouth), or the like. In a case where the subject is close to the TOF sensor 100, the subject region detected by the subject detection unit 206 is large. In a case where the subject is far from the TOF sensor 100, the subject region detected is small. Further, the subject detection unit 206 can output the result of the detected subject region to the three-dimensional conversion unit 208, the subject normalization unit 210, and so on.

In addition, the subject detection unit 206 can also detect the subject region of one of the range image 600 and the direct reflected light image 700 to use the detected subject region as it is for the subject region of the other image. In particular, since the range image 600 and the direct reflected light image 700 are images captured from the same shot from the TOF sensor 100, no alignment is needed between both the images; therefore, the subject region of one of the images can be used, as it is, as the subject region of the other image.

Further, the subject detection unit 206 may determine a final subject region by using both of a detection result of the subject region of the range image 600 and a detection result of the subject region of the direct reflected light image 700. In particular, in the direct reflected light image 700, for example, detecting the contour of the face of a person is difficult in a case where the contrast between the face of the person and a background thereof is low. On the other hand, in the range image 600, even in a case where the contrast is low as described above, detecting the contour of the face is easy because the position of the face of the person and the position of the background are different. However, in the range image 600, it is difficult to detect feature points having less unevenness such as eyes, nose, and mouth of the face. Accordingly, the subject detection unit 206 uses both the range image 600 and the direct reflected light image 700 to detect the subject region; thereby compensate for weak points in detection of the range image 600 and the direct reflected light image 700, resulting in further improvement in the accuracy of detection of the subject region.

(Three-Dimensional Conversion Unit 208)

The three-dimensional conversion unit 208 converts the distance information that is 2.5-dimensional information calculated by the distance information calculation unit 202 to coordinate values of a three-dimensional space in the real space. In particular, the three-dimensional conversion unit 208 converts the distance information to coordinates (X, Y, Z) of the three-dimensional space by converting the position information of a pixel of the light receiving unit 104 of the TOF sensor 100 to coordinate values of the real space, and then generates three-dimensional coordinate information (three-dimensional information). The conversion described above enables the distance information to be treated as the actual distance in the space. Further, the three-dimensional conversion unit 208 can output the three-dimensional coordinate information, for example, to the subject normalization unit 210 described later. Note that the three-dimensional conversion unit 208 is not necessarily provided in the processing unit 200.

(Subject Normalization Unit 210)

The subject normalization unit 210 normalizes the subject regions of the range image 600, the direct reflected light image 700, and the three-dimensional information (not shown). Examples of the normalization performed by the subject normalization unit 210 include normalization of direction, normalization of scale, and normalization of lightness. The subject normalization unit 210 outputs the normalized subject region to the subject identification unit 212 and the storage unit 300 described later. Note that, as described above, the three-dimensional information is an aggregation of three-dimensional coordinate information (coordinate information of X, Y, and Z).

Figure 9:
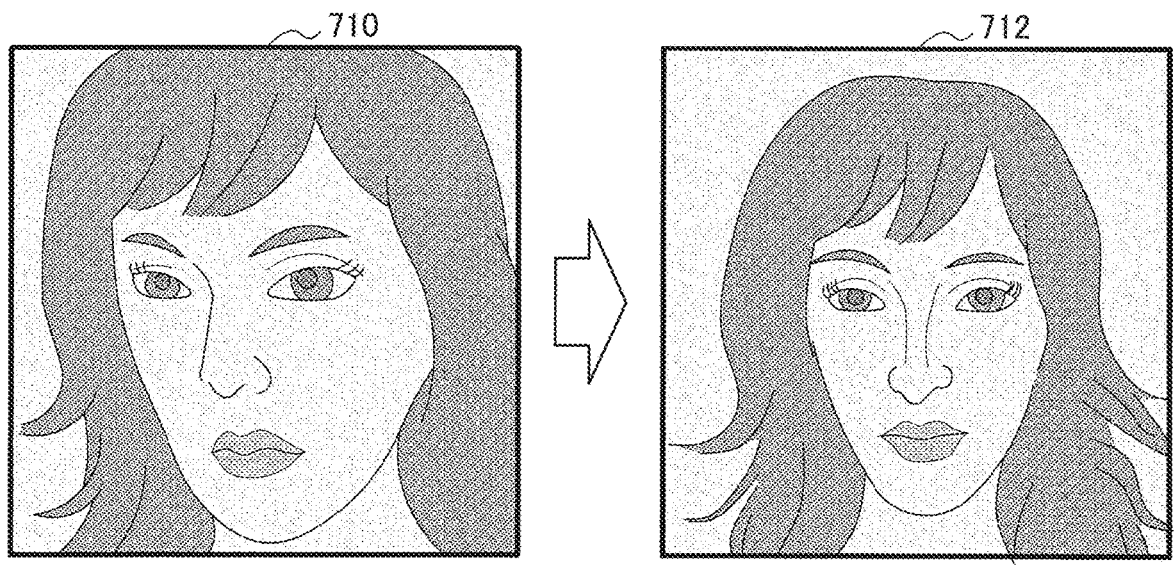
FIG. 9 is an explanatory diagram for illustrating an example of normalization in the first embodiment.

An example of the normalization by the subject normalization unit 210 is described with reference to FIG. 9. FIG. 9 is an explanatory diagram for illustrating an example of the normalization in this embodiment, more particularly, an example of normalization of direction of the face of a person. In particular, FIG. 9 shows, on its left side, a subject region 710 of a direct reflected light image before normalization, and FIG. 9 shows, on its right side, a subject region 712 of the direct reflected light image after normalization. In the subject region 710 of the direct reflected light image before normalization, the face of the person is oriented obliquely, not front. Accordingly, the subject normalization unit 210 detects the oblique orientation of the face of the person, for example, on the basis of the positional relationship, shape, or the like of the predetermined feature points (eyes, nose, mouth) in the subject region 710 of the direct reflected light image before normalization, and normalizes the subject region 710 of the direct reflected light image before normalization so that the face is oriented front. As a result, the subject normalization unit 210 can obtain the subject region 712 of the direct reflected light image after normalization shown on the right side of FIG. 9.

In this embodiment, the subject normalization unit 210 is not limited to performing the normalization that the face is oriented front as shown in FIG. 9, may perform normalization so that the person faces toward a preset predetermined direction (orientation), e.g., so as to adjust to a direction in the image stored in the storage unit 300, and not particularly limited. For example, performing normalization so as to adjust to a direction in the image stored in the storage unit 300 makes the direction in an image to be compared the same as the direction in the image stored in the storage unit 300, resulting in further improvement in the accuracy of comparison by the subject identification unit 212 described later.

In addition, in this embodiment, the subject normalization unit 210 is not limited to performing the normalization of the subject region 710 of the direct reflected light image as shown in FIG. 9, and can also normalize a subject region (not shown) or the three-dimensional information (not shown) of the range image 600. In this case, the subject normalization unit 210 can perform normalization so that the face of the person is oriented front, for example, on the basis of a shape of a predetermined contour (face contour) in the subject region of the range image 600. In other words, the subject normalization unit 210 the subject normalization unit 210 can normalize at least one of the subject regions of the range image 600, the direct reflected light image 700, or the three-dimensional information.

However, it is preferable that the subject normalization unit 210 normalize two subject regions of the subject region of the range image 600 or the three-dimensional information (not shown) and the subject region of the direct reflected light image 700. This further improves the accuracy of normalization. In particular, it is preferable that the subject normalization 210 determine parameters for normalization by using both the result of detection of the face orientation in the subject region of the range image 600 or the three-dimensional information and the result of detection of the face orientation of the person in the subject region of the direct reflected light image 700. As described above, the range image 600 or the three-dimensional information is different from the direct reflected light image 700 in detection ease and difficulty. To address this, the subject normalization 210 uses both the results of detection to determine the face orientation, and thereby can compensate for weak points in detection in the range image 600 or the three-dimensional information and the direct reflected light image 700, resulting in improvement in the accuracy of detection of the face orientation.

Further, in this embodiment, the subject normalization unit 210 may perform normalization so that the size (scale)

of the subject region in the range image 600, the direct reflected light image 700, and the three-dimensional information (not shown) is adjusted to a predetermined size (scale). As described above, the subject region is small in a case where the distance from the TOF sensor 100 to the subject is long, and the subject region is large in a case where the distance from the TOF sensor 100 to the subject is short. Therefore, for example, the subject normalization unit 210 performs normalization by enlarging or reducing the size of the subject region in the range image 600, the direct reflected light image 700, and the three-dimensional information by the subject normalization unit 210 so that the subject region has the same size as that of the image stored in the storage unit 300. Stated differently, the subject normalization unit 210 can normalize the subject region by using the image stored in the storage unit 300 as a reference, in a manner to be an image which is captured at the same distance as the distance (predetermined distance) between the subject and the TOF sensor 100 for the case where the reference image has been captured. This makes the accuracy (resolution) of the image stored in the storage unit 300 and the accuracy of the image to be compared the same as each other, which further improves the accuracy of comparison in the subject identification unit 212 described later.

In addition, in this embodiment, the subject normalization unit 210 may normalize the subject region in the range image 600, the direct reflected light image 700, and the three-dimensional information (not shown) by using the image stored in the storage unit 300 as a reference, so as to be an image having the same lightness (brightness), contrast, or the like as the reference image has. This makes the lightness or the like of the image or information stored in the storage unit 300 and the lightness or the like of the image or information to be compared the same as each other, which further improves the accuracy of comparison in the subject identification unit 212 described later.

As described above, the subject normalization unit 210 may normalize at least one of the subject regions of the range image 600, the direct reflected light image 700, or the three-dimensional information (not shown), and normalize a part or all of the subject regions thereof, and in this embodiment, there is no particular limitation. Further, at the time of normalization of a subject region of another image, the subject normalization unit 210 may directly use the parameters for normalization (for example, parameters used for the normalization of direction) which are used in one of the subject regions of the range image 600, the direct reflected light image 700, and the three-dimensional information. Since the range image 600, the direct reflected light image 700, and the three-dimensional information are information obtained with the same shot by the TOF sensor 100, no alignment is needed between the both, which enables direct use of the parameters.

(Subject Identification Unit 212)

In the identification stage described later, the subject identification unit 212 reads out the image stored in the storage unit 300, and compares the readout image with the subject regions of the range image 600, the direct reflected light image 700, and the three-dimensional information (not shown) obtained from the subject normalization unit 210. In particular, the subject identification unit 212 can make the comparison by checking the feature points of each of the images, the positional relationship thereof, or the like. At this time, the subject identification unit 212 uses images of the same type to make a comparison, such as a case where the subject identification unit 212 reads out the range image 600 from the storage unit 300 in the case of the subject region of the range image 600. In a case where the readout image matches the subject region, the subject identification unit 212 outputs, to the display unit 400 for example, information indicating that the readout image matches the subject region and information (name, and so on) stored so as to be linked with the readout image. In a case where the readout image does not match the subject region, the subject identification unit 212 outputs, to the display unit 400 for example, information indicating that the readout image does not match the subject region. Note that the subject identification unit 212 may output the identification result obtained by the comparison as described above to a functional unit (not shown) other than the display unit 400, and the functional unit may control further another functional unit on the basis of the identification result.

<3.4 Identification Method>

Each of the devices included in the identification system 10 according to this embodiment is detailed above. Next, an identification method according to this embodiment is described. The identification method according to this embodiment is divided into, mainly, two stages of a registration stage up to storage of an image into the storage unit 300 and an identification stage for performing identification using the image stored in the storage unit 300. Note that, in the identification method described below, the processing unit 200 is not necessarily provided with the three-dimensional conversion unit 208 described above.

<3.4.1 Registration Stage>

Figure 10:
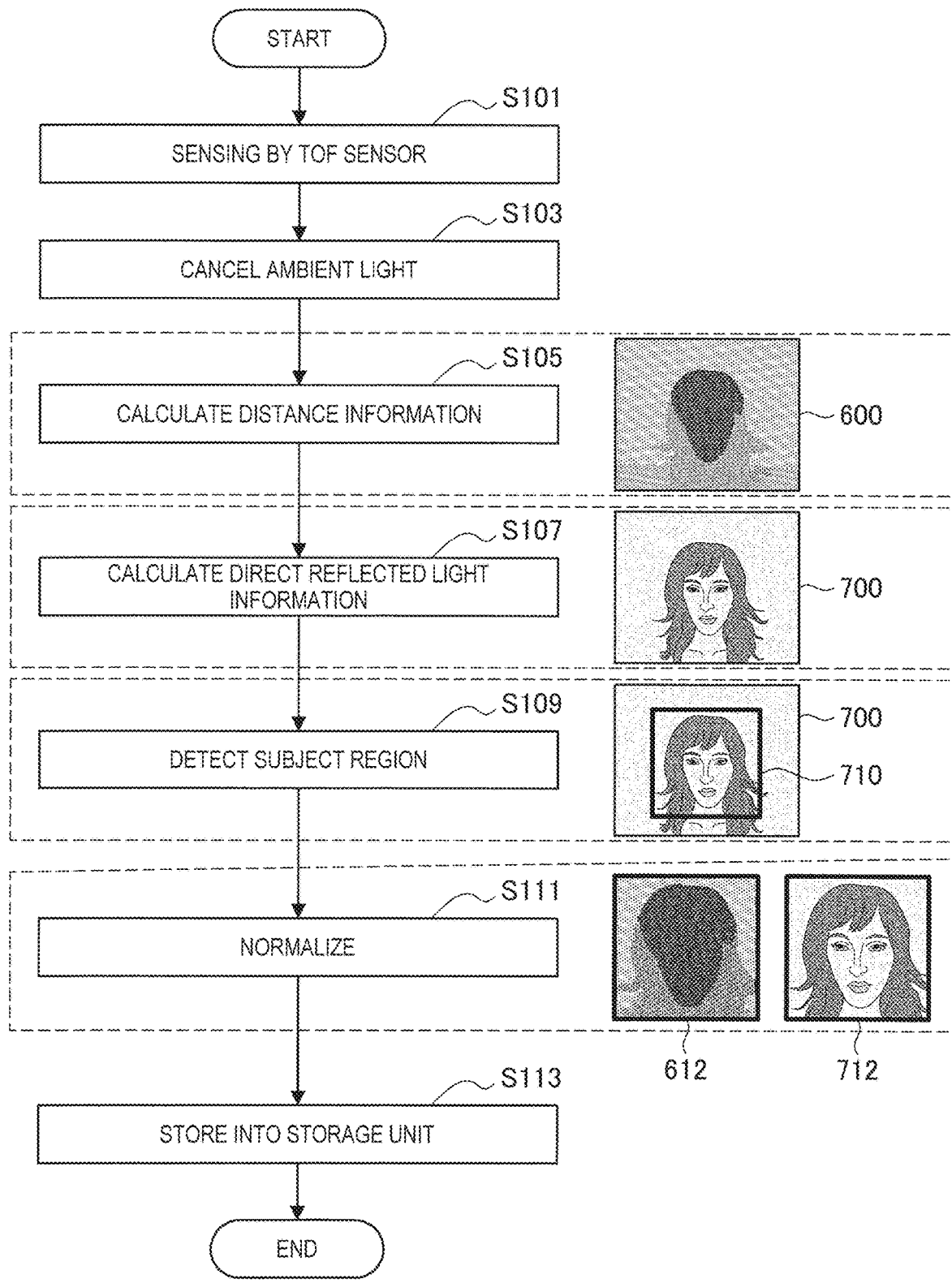
FIG. 10 is a flowchart for illustrating a registration stage of an identification method according to the first embodiment.

First, the registration stage of the identification method according to this embodiment is described with reference to FIG. 10. FIG. 10 is a flowchart for illustrating the registration stage of the identification method according to this embodiment. As shown in FIG. 10, the registration stage according to this embodiment includes a plurality of steps from Step S101 to Step S113. The following describes the details of each of the steps included in the registration stage according to this embodiment.

(Step S101)

First, the TOF sensor 100 applies light to a subject (for example, the face of a person) and outputs, to the processing unit 200, sensing data obtained by detecting the reflected light (sensing by the TOF sensor 100).

(Step S103)

The processing unit 200 performs processing of canceling ambient light (indirect reflected light) on the sensing data as described above.

(Step S105)

The processing unit 200 calculates the distance information (range image 600) of the subject on the basis of the sensing data in which the ambient light has been canceled in Step S103 described above.

(Step S107)

The processing unit 200 calculates the direct reflected light information (direct reflected light image 700) of the subject on the basis of the sensing data in which the ambient light has been canceled in Step S103 described above.

(Step S109)

The processing unit 200 detects a subject region (not shown) in the range image 600 obtained in Step S105 described above. The processing unit 200 further detects the subject region 710 in the direct reflected light image 700 obtained in Step S107 described above. Note that, in FIG. 10, the illustration of the detection of the subject region in the range image 600 is omitted.

(Step S111)

The processing unit 200 normalizes the subject regions 710 of the range image 600 and the direct reflected light image 700 obtained in Step S109 described above to obtain a subject region 612 of the range image after normalization and the subject region 712 of the direct reflected light image after normalization. Note that the normalization herein can be normalization of direction, normalization of scale, normalization of lightness, and so on, and is not particularly limited thereto.

(Step S113)

The processing unit 200 stores, into the storage unit 300, the normalized subject region 612 and the normalized subject region 712 obtained in Step S111 described above.

<3.4.2 Identification Stage>

Figure 11:
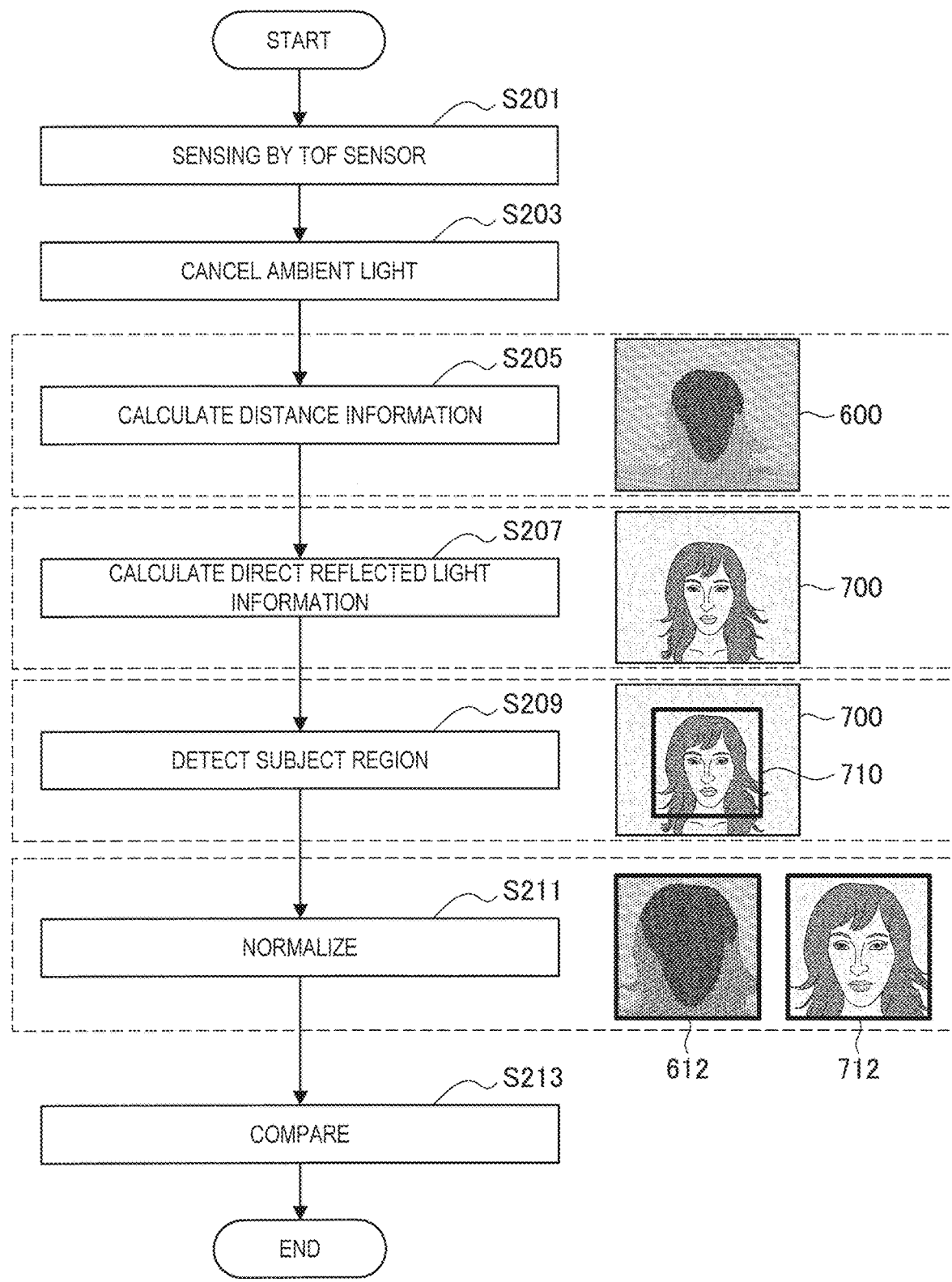
FIG. 11 is a flowchart for illustrating an identification stage of an identification method according to the first embodiment.

Next, the identification stage of the identification method according to this embodiment is described with reference to FIG. 11. FIG. 11 is a flowchart for illustrating the identification stage of the identification method according to this embodiment. As shown in FIG. 11, the identification stage according to this embodiment includes a plurality of steps from Step S201 to Step S213. Note that, since Step S201 to Step S211 in FIG. 11 are the same as Step S101 to Step S111 in FIG. 10 described above, the detailed description of these steps is omitted herein and only Step S213 is described. In addition, in FIG. 11 also, the illustration of the detection of the subject region in the range image 600 is omitted.

(Step S213)

The processing unit 200 reads out the image stored in the storage unit 300 (for example, face image of the person stored in the registration stage), and compares the readout image and the normalized subject region 612 and the normalized subject region 712 (face image of the person herein). Then, in a case where the readout image matches the normalized subject regions 612 and 712, the processing unit 200 outputs, to the user, information indicating that the readout image matches the normalized subject regions 612 and 712 and information (the person name, and so on) stored so as to be linked with the readout image. In a case where the readout image does not match the normalized subject regions, the processing unit 200 outputs, to the user, information indicating that the readout image does not match the normalized subject regions.

As described above, in this embodiment, the identification is performed using the range image 600 or the direct reflected light image 700 that is less likely to be influenced by variations in ambient light instead of using a two-dimensional image that is easily influenced by variations in ambient light. Thus, it is possible to perform stable identification with high accuracy.

4. Second Embodiment

In the first embodiment described above, the range image 600 that is 2.5-dimensional information is used. The second embodiment described below is different from the first embodiment in that the 2.5-dimensional information is converted to three-dimensional information (three-dimensional coordinate information). The following describes the details of the second embodiment.

Note that, in the following description, only the points different from the first embodiment are described, and description of points common to the first embodiment is omitted. Specifically, in this embodiment, the detailed configuration of the identification system 10 and the detailed configuration of the devices included in the identification system 10 are common to those of the first embodiment, except that the processing unit 200 includes the three-dimensional conversion unit 208. Accordingly, the description of the detailed configuration of the identification system 10 according to this embodiment and of the detailed configuration of the devices included in the identification system 10 is omitted herein.

<4.1 Identification Method>

The identification method according to this embodiment is described. As with the first embodiment, the identification method according to this embodiment can be divided into, mainly, two stages of a registration stage up to storage of an image into the storage unit 300 and an identification stage for performing identification using the image stored in the storage unit 300.

<4.1.1 Registration Stage>

Figure 12:
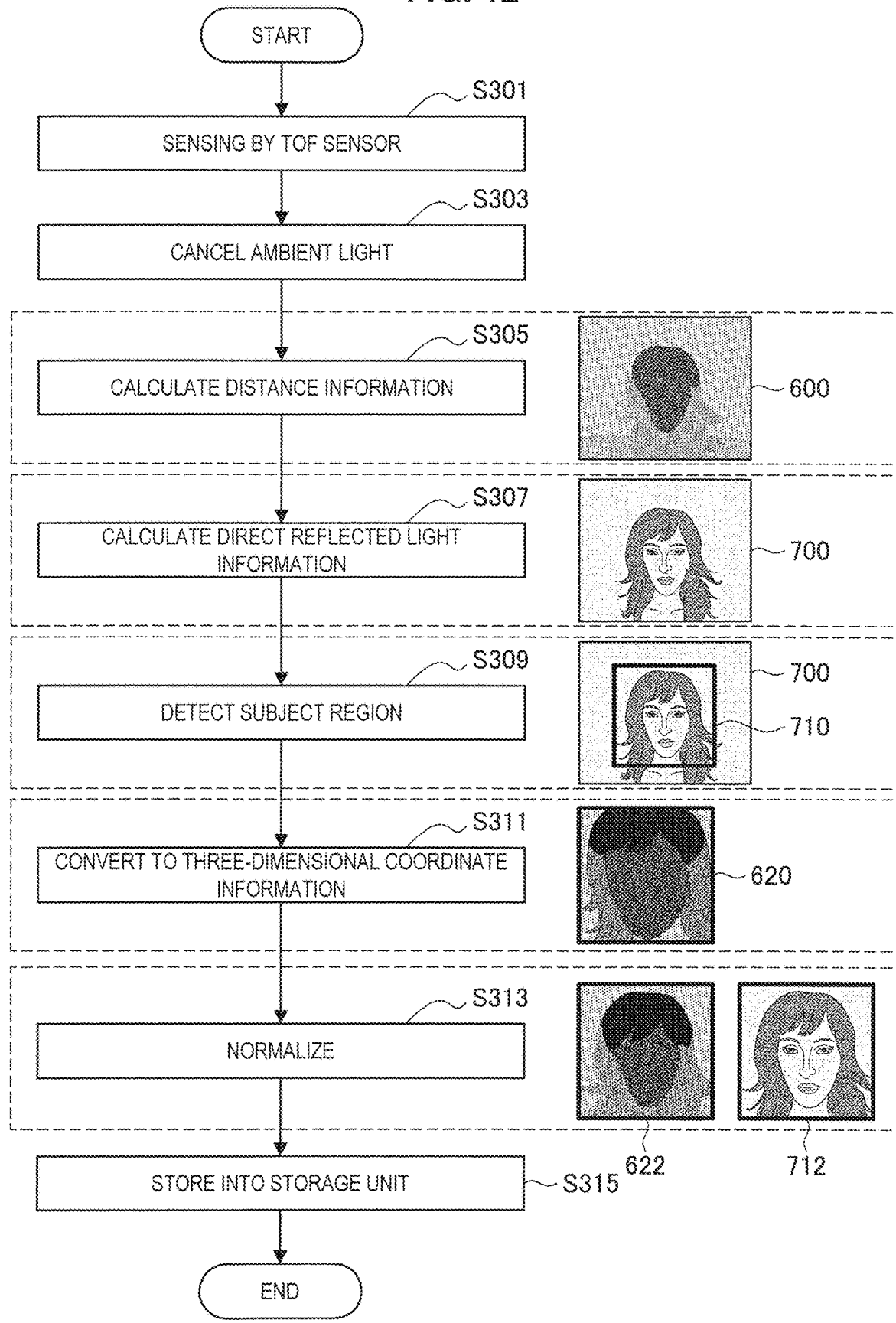
FIG. 12 is a flowchart for illustrating a registration stage of an identification method according to a second embodiment of the present disclosure.

First, the registration stage of the identification method according to this embodiment is described with reference to FIG. 12. FIG. 12 is a flowchart for illustrating the registration stage of the identification method according to this embodiment. As shown in FIG. 12, the registration stage according to this embodiment includes a plurality of steps from Step S301 to Step S315. Note that the description of Step S301 to Step S309 of FIG. 12 is omitted herein because Step S301 to Step S309 are the same as Step S101 to Step S109 of FIG. 10 in the first embodiment. In addition, in FIG. 12 also, the illustration of the detection of the subject region in the range image 600 is omitted.

(Step S311)

The processing unit 200 converts the subject region (not shown) of the range image 600 obtained in Step S309 to three-dimensional coordinate information to obtain a subject region 620 of the three-dimensional information of the subject.

(Step S313)

As with Step S111 of FIG. 10 in the first embodiment, the processing unit 200 normalizes the subject region 620 of the three-dimensional information obtained in Step S311 and the subject region 710 of the direct reflected light image 700 obtained in Step S309. The processing unit 200 then obtains a subject region 622 of the three-dimensional information after normalization and the subject region 712 of the direct reflected light image after normalization.

(Step S315)

The processing unit 200 stores, into the storage unit 300, the normalized subject region 622 and the normalized subject region 712 obtained in Step S313 described above.

<4.1.2 Identification Stage>

Figure 13:
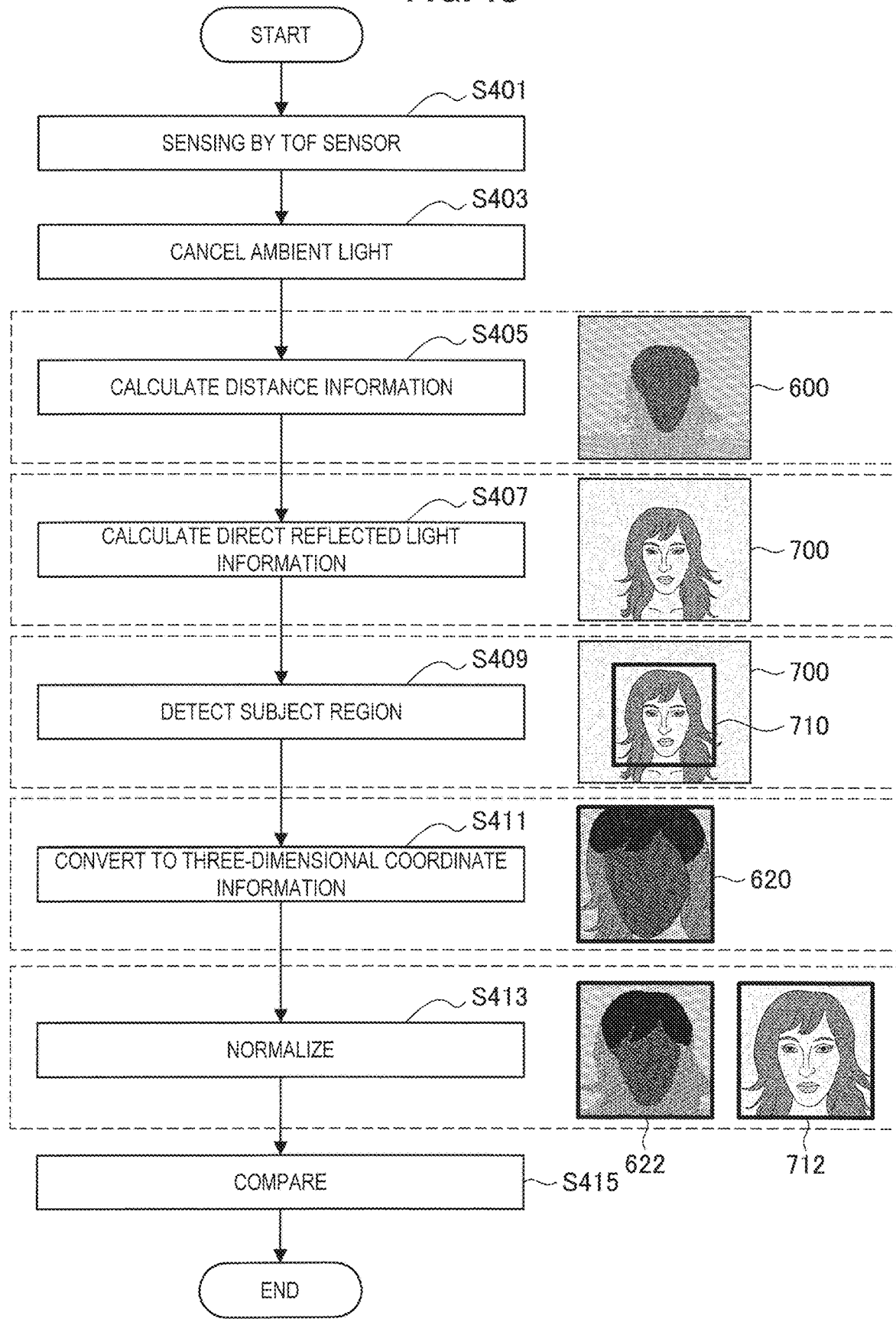
FIG. 13 is a flowchart for illustrating an identification stage of an identification method according to the second embodiment.

Next, the identification stage of the identification method according to this embodiment is described with reference to FIG. 13. FIG. 13 is a flowchart for illustrating the identification stage of the identification method according to this embodiment. As shown in FIG. 13, the registration stage according to this embodiment includes a plurality of steps from Step S401 to Step S415. Note that, since Step S401 to Step S413 in FIG. 13 are the same as Step S301 to Step S313 in FIG. 12 described above and Step S415 in FIG. 13 is similar to Step S213 in FIG. 11 of the first embodiment, the detailed description of these steps is omitted herein. In addition, in FIG. 13 also, the illustration of the detection of the subject region in the range image 600 is omitted.

As with the first embodiment, in this embodiment, the identification is performed using the three-dimensional information (not shown) or the direct reflected light image 700 that is less likely to be influenced by variations in ambient light instead of using a two-dimensional image that is easily influenced by variations in ambient light. Thus, it is possible to perform stable identification with high accuracy.

5. Third Embodiment

Figure 14:
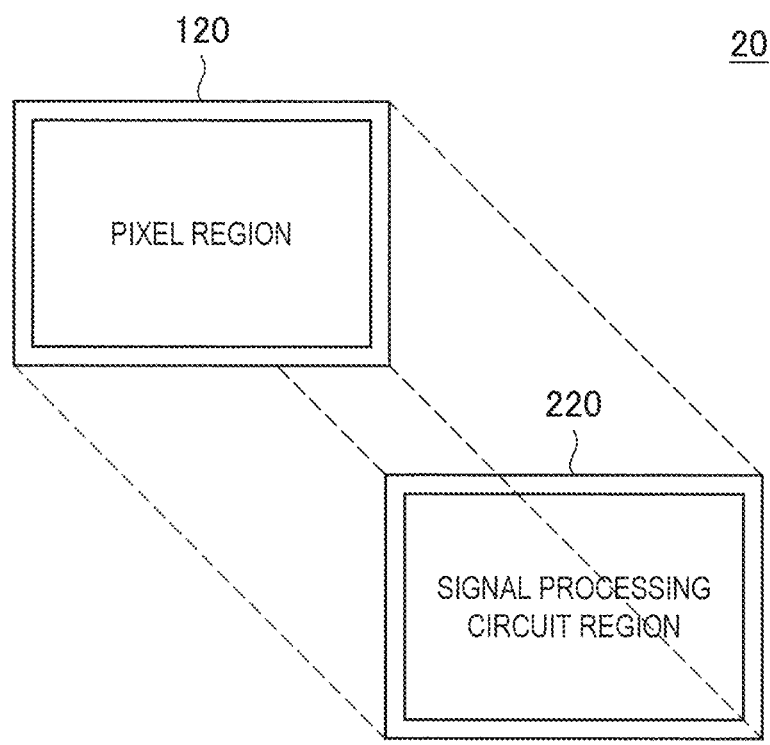
FIG. 14 is a diagram showing a configuration example of a stacked image sensor 20 according to a third embodiment of the present disclosure.
Figure 15:
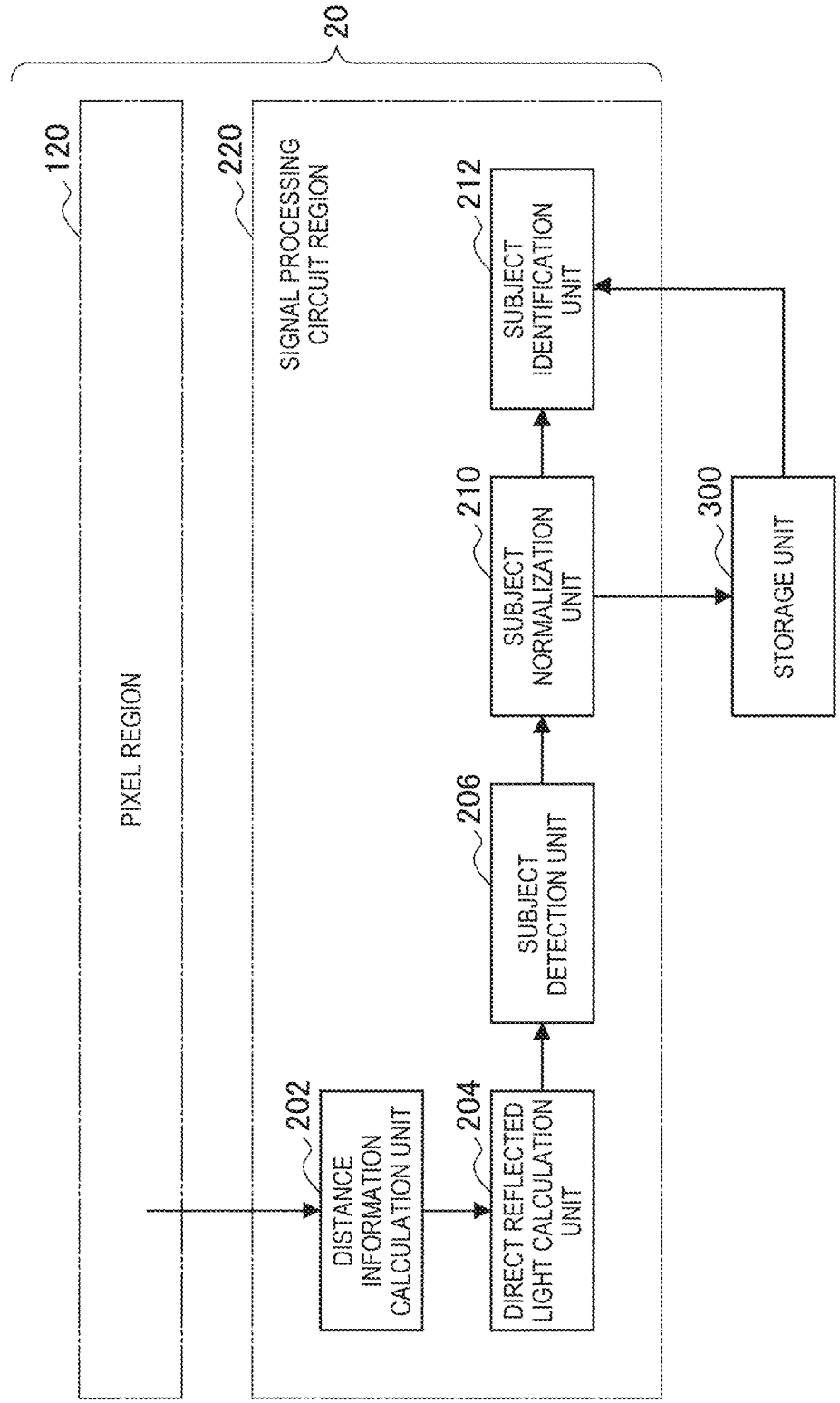
FIG. 15 is a block diagram showing a detailed configuration example of the stacked image sensor 20 according to the third embodiment.

In the first and second embodiments described above, the identification system 10 includes a plurality of devices;

however, at least a part of the identification system 10 may be constructed by a stacked image sensor. In view of this, the third embodiment is described in which the TOF sensor 100 and the processing unit 200 are implemented by a stacked image sensor with reference to FIG. 14 and FIG. 15. FIG. 14 is a diagram showing a configuration example of a stacked image sensor 20 according to this embodiment. FIG. 15 is a block diagram showing a detailed configuration example of the stacked image sensor 20 according to this embodiment.

As shown in FIG. 14, in the stacked image sensor 20, a pixel region 120 and a signal processing circuit region 220 are stacked on each other. Note that, in FIG. 14, the pixel region 120 is shown as being stacked on the signal processing circuit region 220; however, in this embodiment, the stacking order is not limited to the order shown in FIG. 14, and may be the reverse order.

Further, as shown in FIG. 15, the signal processing circuit region 220 includes the distance information calculation unit 202, the direct reflected light calculation unit 204, the subject detection unit 206, the subject normalization unit 210, and the subject identification unit 212. In other words, in the stacked image sensor 20, the pixel region 120 functions as the TOF sensor 100 and outputs the sensing data to the signal processing circuit region 220. The signal processing circuit region 220 functions as the processing unit 200, outputs an image obtained by processing the sensing data to the storage unit 300, and performs identification using the image stored in the storage unit 300. In FIG. 15, the signal processing circuit region 220 may be provided with the three-dimensional conversion unit 208 as needed, or may be provided with non-illustrated another functional unit. In other words, in this embodiment, the identification system 10 can include one stacked image sensor 20 and the storage unit 300 external to the stacked image sensor 20.

Figure 16:
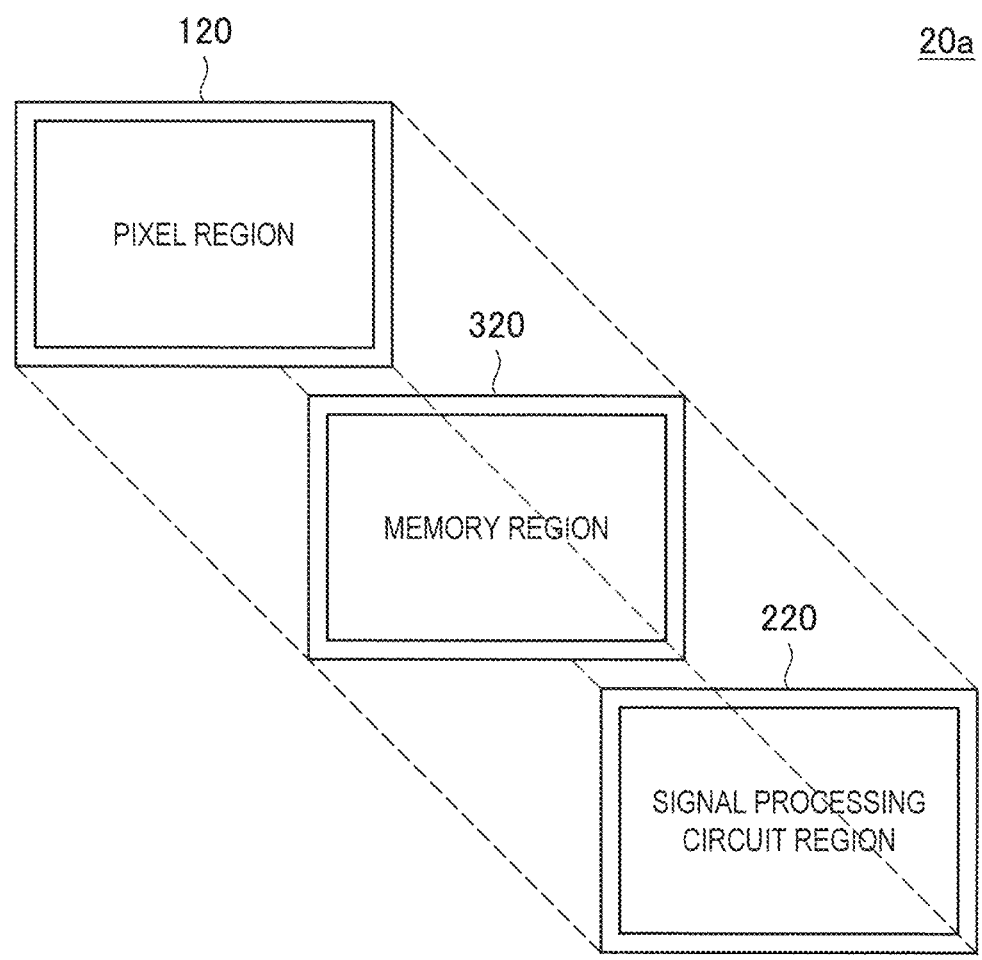
FIG. 16 is a diagram showing a configuration example of a stacked image sensor 20a according to a modified example of the third embodiment.
Figure 17:
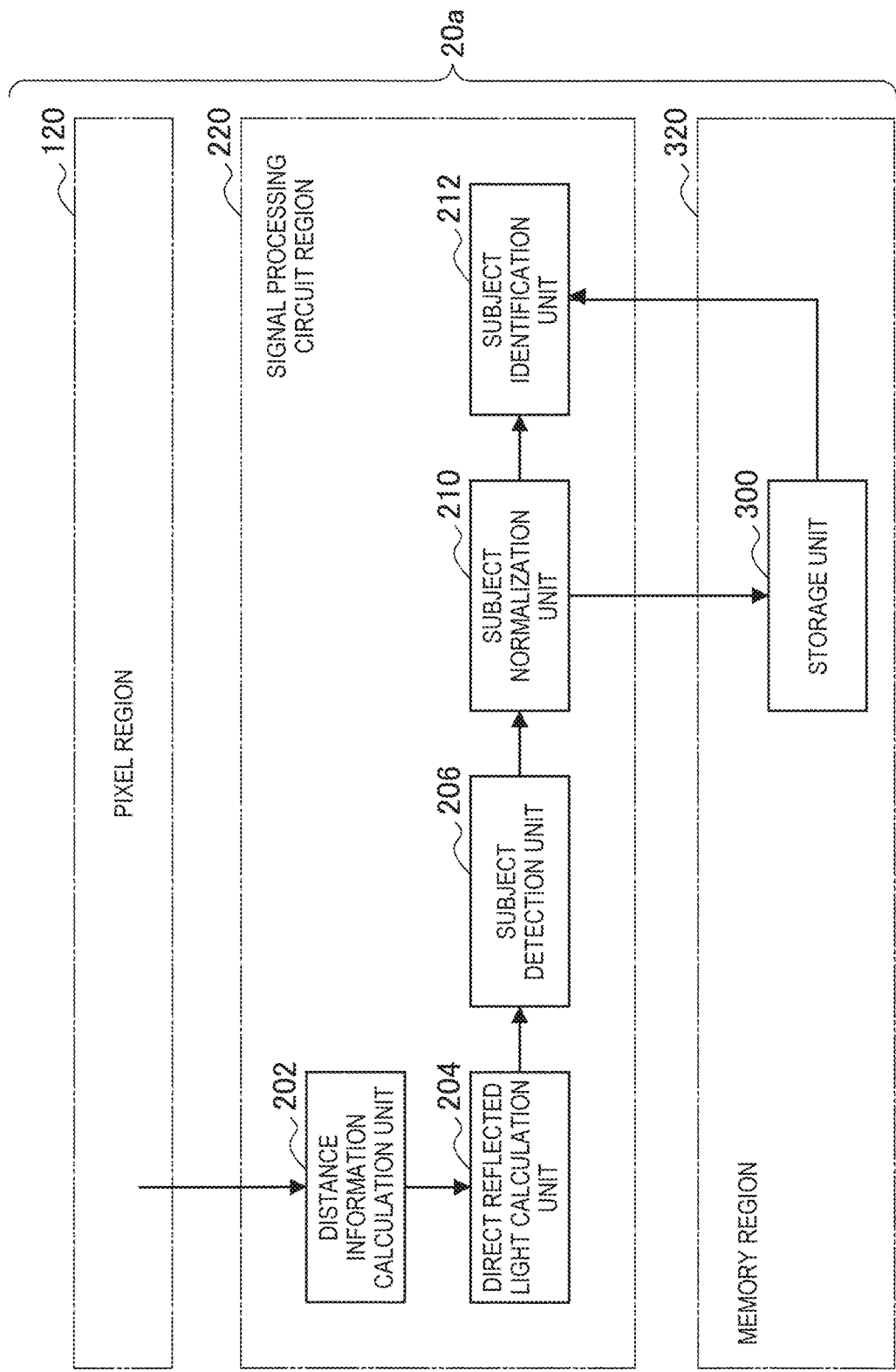
FIG. 17 is a block diagram showing a detailed configuration example of the stacked image sensor 20a according to a modified example of the third embodiment.

In addition, the stacked image sensor may be a three-layer stacked image sensor. As a modified example of this embodiment, an example of a three-layer stacked image sensor 20a is described with reference to FIG. 17 and FIG. 18. FIG. 16 is a diagram showing a configuration example of the stacked image sensor 20a according to a modified example of this embodiment. FIG. 17 is a block diagram showing a detailed configuration example of the stacked image sensor 20a according to the modified example of this embodiment.

As shown in FIG. 16, in the three-layer stacked image sensor 20a, a memory region 320 is stacked in addition to the pixel region 120 and the signal processing circuit region 220. Note that FIG. 16 shows the pixel region 120 stacked on the memory region 320, and the memory region 320 stacked on the signal processing circuit region 220. In this embodiment, however, the stacking order is not limited to the order as that shown in FIG. 16 and may be different order.

In this modified example, as shown in FIG. 17, the memory region 320 is provided with the storage unit 300 for storing an image used for identification. In other words, in this modified example, the identification system 10 can be implemented by one stacked image sensor 20a. Stated differently, the stacked image sensor 20a by itself can perform identification. Note that, in this modified example also, the signal processing circuit region 220 may be provided with the three-dimensional conversion unit 208, and so on as needed.

As described above, according to this embodiment and this modified example, at least a part of the identification system 10 is implemented by the stacked image sensor 20; thereby, the identification system 10 can be a more compact system with reduced power consumption. As a result of the foregoing, the identification system 10 according to the embodiments of the present disclosure can be mounted on various electronic devices as described later.

6. Fourth Embodiment

As described above, the identification system 10 (stacked image sensor 20) according to the first through third embodiments can be mounted on an electronic device such as a desktop personal computer (PC), a notebook PC, a laptop PC, a smartphone, a cellular phone, a camera, or a wearable device.

For example, the identification system 10 according to this embodiment can be mounted on various PCs, smartphones, cellular phones, or the like as a face authentication device in order to perform authentication of a user who uses such an electronic device or perform electronic payment. In addition, the identification system 10 can be mounted on a security camera, a security system, or the like as a device for detecting a suspicious person or the like. In addition, the identification system 10 according to this embodiment can be mounted on an inspection system or the like as an inspection device for image identification as to whether or not a product is properly manufactured at various factories on the basis of the shape or the like of the product.

In addition, the identification system 10 may be mounted, as a device for recognizing the surrounding space, on a head mounted display (HMD) or a glasses-type wearable device in order to accurately recognize the space around a user. Further, the identification system 10 according to this embodiment may be mounted on a self-propelled robot or the like in order to recognize obstacles therearound. In addition, the identification system 10 may be mounted on a camera having an autofocus function so that the accuracy of detection of a subject by the camera is improved and a camera focus is controlled more accurately.

Figure 18:
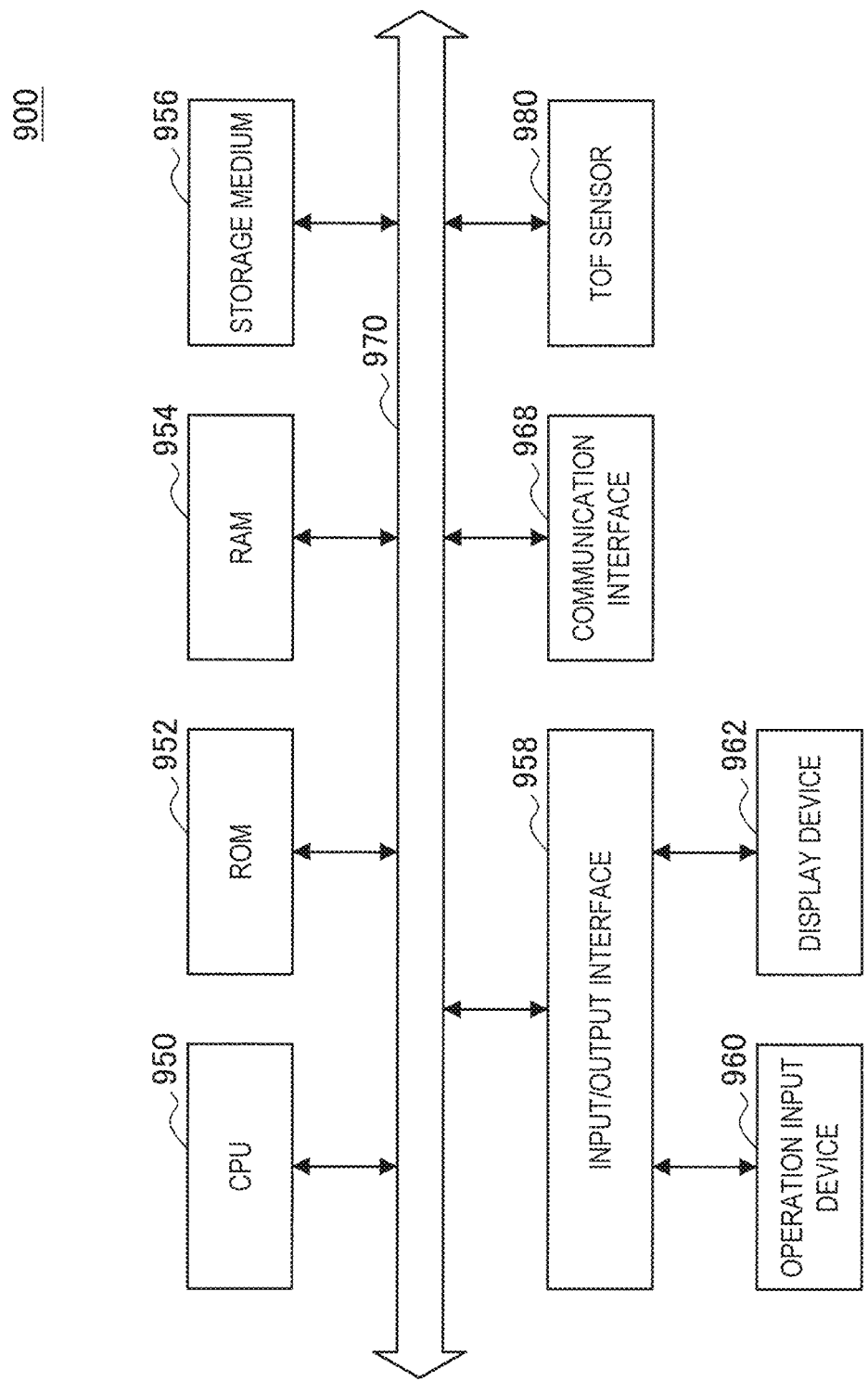
FIG. 18 is a block diagram showing an example of the hardware configuration of an electronic device 900 according to a fourth embodiment of the present disclosure.

In view of this, as the fourth embodiment of the present disclosure, a configuration example of an electronic device 900 on which the identification system 10 is mounted is described with reference to FIG. 18. FIG. 18 is a block diagram showing an example of the hardware configuration of the electronic device 900 according to this embodiment.

The electronic device 900 includes, for example, a CPU 950, a ROM 952, a RAM 954, a recording medium 956, an input/output interface 958, and an operation input device 960. The electronic device 900 further includes a display device 962, a communication interface 968, and a TOF sensor 980. Further, in the electronic device 900, the individual structural elements are connected with one another by, for example, a bus 970 as a data transmission path.

(CPU 950)

The CPU 950 includes different processing circuits and at least one or two processors having arithmetic circuits such as a CPU, and functions as a control unit that controls the entire electronic device 900. Specifically, the CPU 950 functions as, for example, the distance information calculation unit 202, the direct reflected light calculation unit 204, the subject detection unit 206, the three-dimensional conversion unit 208, the subject normalization unit 210, the subject identification unit 212, and so on.

(ROM 952 and RAM 954)

The ROM 952 stores control data such as a program, operation parameters, and so on used by the CPU 950. The RAM 954 temporarily stores, for example, a program and so on executed by the CPU 950.

(Recording Medium 956)

The recording medium 956 stores, for example, various data such as an image used in the identification method according to this embodiment. The recording medium 956 herein is, for example, a nonvolatile memory such as a flash memory. In addition, the recording medium 956 may be detachable from the electronic device 900.

(Input/output Interface 958, Operation Input Device 960, and Display Device 962)

For example, the operation input device 960, the display device 962, or the like is connected to the input/output interface 958. Examples of the input/output interface 958 include a universal serial bus (USB) terminal, a digital visual interface (DVI) terminal, a high-definition multimedia interface (HDMI) (registered trademark) terminal, and various processing circuits.

The operation input device 960 functions, for example, as an input unit that receives user operation on the electronic device 900 and is connected to the input/output interface 958 inside the electronic device 900.

The display device 962 functions, for example, as the display unit 400 that outputs an identification result to the user. The display device 962 is provided on the electronic device 900, and is connected to the input/output interface 958 inside the electronic device 900. Examples of the display device 962 include a liquid crystal display and an organic electro-luminescence (EL) display.

Note that the input/output interface 958 is connectable to an external device such as an operation input device (keyboard, mouse, or the like, for example) external to the electronic device 900, an external display device, and so on. In addition, the input/output interface 958 may be also connected to a drive (not shown). The drive is a reader/writer for a removable recording medium such as a magnetic disk, an optical disk, or a semiconductor memory, and is built in or externally attached to the electronic device 900. The drive reads out information recorded on the attached removable recording medium and outputs the information to the RAM 954. In addition, the drive can write records onto the attached removable recording medium.

(Communication Interface 968)

The communication interface 968 functions as a communication unit for communicating with a device external to the electronic device 900 wirelessly or by wire. Examples of the communication interface 968 include a communication antenna and a radio frequency (RF) circuit (wireless communication), an IEEE 802.15.1 port and a transmission/reception circuit (wireless communication), an IEEE 802.11 port and a transmission/reception circuit (wireless communication), and a local area network (LAN) terminal and a transmission/reception circuit (wired communication).

(TOF Sensor 980)

The TOF sensor 980 functions as the TOF sensor 100.

The description of an example of the hardware configuration of the electronic device 900 is provided above. Note that the hardware configuration of the electronic device 900 is not limited to the configuration shown in FIG. 18. In particular, each of the structural elements may be implemented using a general-purpose member, or may be implemented by hardware specialized for the function of each of the structural elements. Such a configuration can be appropriately modified according to a technical level at the time of implementation.

For example, the electronic device 900 does not necessarily have the communication interface 968 in a case where the electronic device 900 is configured to perform processing in stand-alone. In addition, the communication interface 968 may have a configuration capable of communicating with at least one or two external devices with a plurality of communication methods. In addition, the electronic device 900 may be configured not to have, for example, the recording medium 956, the operation input device 960, the display device 962, or the like.

In addition, the electronic device 900 according to this embodiment may be a system including a plurality of devices on the premise of connection to a network (or communication between the devices) such as cloud computing. In such a case, the processing for identification or the image used for identification may be performed by a computer (not shown) on the cloud. In other words, the electronic device 900 according to this embodiment described above can be implemented also as a processing system in which a plurality of devices perform the processing related to the identification method according to this embodiment.

7. Summary

As described above, in each of the embodiments of the present disclosure, instead of a two-dimensional image that is easily influenced by variations in ambient light, the range image 600, the three-dimensional information (not shown), and the direct reflected light image 700 that are less likely to be influenced by variations in ambient light are used for identification. Thus, according to the embodiments, it is possible to perform stable identification with high accuracy even in a case where ambient light varies.

In particular, unlike Patent Literature 1 above, according to the embodiments, it is not necessary to estimate lighting conditions at the time of the image capturing of the registration face image 502 and to control the lighting so as to make the lighting conditions at the time of the image capturing of the comparison face image 504 the same as the lighting conditions at the time of the image capturing of the registration face image 502. Thus, according to the embodiments, longer processing time or an increase in power consumption can be avoided as compared with Patent Literature 1, and further, the increasing complexities of the configuration of the identification system or an increase in manufacturing cost can be also avoided.

In addition, according to the embodiments, unlike the method with a stereo camera described earlier, there is no need to provide two cameras. According to the embodiments, thus, it is possible to prevent the device from having a large structure and to avoid an increase in the manufacturing cost.

Further, according to the embodiments, unlike the structured light method described earlier, there is no need to project light having a predetermined pattern on the surface of a subject. According to the embodiments, thus, the accuracy of identification can be improved because no identification is performed using an image of the subject onto which the predetermined pattern is being projected.

In addition, according to the embodiments, it is possible to calculate distance information of the subject without continuously capturing images of the subject while moving the camera around the subject and obtaining a plurality of captured frames of the subject. According to the embodiments, thus, the subject can be identified even in a case where the subject moves or the outline of the subject changes.

In each of the embodiments of the present disclosure, as described above, the identification may be performed by using at least one piece of the distance information (range image 600), the direct reflected light information (direct reflected light image 700), or the three-dimensional coordinate information (three-dimensional image). In the embodiments, however, the accuracy of identification can be further improved; therefore it is preferable to perform identification by using two pieces of the direct reflected light information (direct reflected light image 700), and the distance information (range image 600) or the three-dimensional coordinate information (three-dimensional image).

In addition, in the embodiments of the present disclosure, the description is provided assuming that the face of a person is identified. However, in the embodiments, the identification is not limited to the identification of the face of a person, and is applicable to identification of another object such as identification of the shape of a product.

8. Supplement

Each of the steps in the identification method according to the embodiments is not necessarily processed along the presented order. For example, each of the steps may be processed with the order changed appropriately. Further, each of the steps may be processed partly in parallel or separately instead of being processed in the chronological order. Further, the processing of each of the steps is not necessarily processed according to the described method, and may be processed, for example, by another functional block using another method.

Further, at least a part of the identification method according to the embodiments can be implemented by software as an information processing program which causes a computer to function. In that case, a program for implementing at least a part of these methods may be stored in a recording medium and may be read into and executed by the processing unit 200, the electronic device 900, and the like, or, by another device connected to the processing unit 200 or the electronic device 900. In addition, a program for implementing at least a part of the identification method may be distributed via a communication line (including wireless communication) such as the Internet. Further, the program may be encrypted, modulated, or compressed, and then, the resultant program may be distributed via a wired line such as the Internet or a wireless line, or stored in a recording medium for distribution.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An identification device including:

a direct reflected light information calculation unit configured to calculate, on the basis of sensing data by a TOF sensor that applies light to an object to detect the light, direct reflected light information about direct reflected light from the object;

an object detection unit configured to detect the object on the basis of the direct reflected light information; and an object identification unit configured to identify the object on the basis of the direct reflected light information about the object detected.

(2)

The identification device according to (1), in which the TOF sensor includes first and second light receiving units different in operation from each other, and the direct reflected light information calculation unit calculates the direct reflected light information on the basis of intensity of the light detected by the first and second light receiving units.

(3)

The identification device according to (1), in which the TOF sensor includes one light receiving unit, and first and second readout units configured to read out light received by the light receiving unit at different times, and the direct reflected light information calculation unit calculates the direct reflected light information on the basis of intensity of the light read out by the first and second readout units.

(4)

The identification device according to (2) or (3), in which the direct reflected light information calculation unit calculates the direct reflected light information on the basis of a difference between an integrated value of intensity of light detected by the first light receiving unit and an integrated value of intensity of light detected by the second light receiving unit, or on the basis of a difference between an integrated value of intensity of light read out by the first readout unit and an integrated value of intensity of light readout by the second readout unit.

(5)

The identification device according to any one of (1) to (4), further including a normalization processing unit configured to normalize the direct reflected light information about the object detected.

(6)

The identification device according to (5), in which the normalization processing unit normalizes the direct reflected light information about the object detected so as to adjust a distance from the TOF sensor to the object to a predetermined distance, so as to adjust a size of the object to a predetermined size, so as to adjust an orientation of the object to a predetermined orientation, or so as to adjust brightness of the direct reflected light information about the object detected to predetermined brightness.

(7)

The identification device according to any one of (1) to (6), further including a storage unit configured to store the direct reflected light information about the object, in which the object identification unit identifies the object by comparing direct reflected light information stored beforehand about the object and the direct reflected light information newly calculated about the object.

(8)

The identification device according to (7), in which the storage unit stores direct reflected light information normalized about the object.

(9)

The identification device according to any one of (1) to (8), further including a distance information calculation unit configured to calculate distance information about the object on the basis of the sensing data, in which the object identification unit identifies the object on the basis of the distance information.

(10)

An identification device including:

a distance information calculation unit configured to calculate, on the basis of sensing data by a TOF sensor that applies light to an object to detect the light, distance information about the object;

an object detection unit configured to detect the object on the basis of the distance information; and an object identification unit configured to identify the object on the basis of the distance information about the object detected.

(11)

The identification device according to (10), in which the distance information calculation unit calculates the distance information on the basis of a phase difference between the light applied and the light detected.

(12)

The identification device according to (10) or (11), in which the TOF sensor includes first and second light receiving units different in operation from each other, and the distance information calculation unit calculates the distance information on the basis of intensity of the light detected by the first and second light receiving units.

(13)

The identification device according to (10) or (11), in which the TOF sensor includes one light receiving unit, and first and second readout units configured to read out light received by the light receiving unit at different times, and the distance information calculation unit calculates the distance information on the basis of intensity of the light read out by the first and second readout units.

(14)

The identification device according to (12) or (13), in which the distance information calculation unit calculates the distance information on the basis of a difference between an integrated value of intensity of light detected by the first light receiving unit and an integrated value of intensity of light detected by the second light receiving unit, or on the basis of a difference between an integrated value of intensity of light read out by the first readout unit and an integrated value of intensity of light readout by the second readout unit.

(15)

The identification device according to any one of (10) to (14), further including a normalization processing unit configured to normalize the distance information about the object detected, in which the normalization processing unit normalizes the distance information about the object detected so as to adjust a distance from the TOF sensor to the object to a predetermined distance, so as to adjust a size of the object to a predetermined size, so as to adjust an orientation of the object to a predetermined orientation, or so as to adjust brightness of direct reflected light information about the object detected to predetermined brightness.

(16)

The identification device according to any one of (10) to (15), further including a storage unit configured to store the distance information about the object, in which the object identification unit identifies the object by comparing distance information stored beforehand about the object and the distance information newly calculated about the object.

(17)

The identification device according to (10), further including a three-dimensional coordinate calculation unit configured to calculate three-dimensional coordinate information about the object on the basis of the distance information, in which the object identification unit identifies the object on the basis of the three-dimensional coordinate information.

(18)

The identification device according to (17), further including a normalization processing unit configured to normalize the three-dimensional coordinate information, in which the normalization processing unit normalizes the three-dimensional coordinate information so as to adjust a distance from the TOF sensor to the object to a predetermined distance, so as to adjust a size of the object to a predetermined size, so as to adjust an orientation of the object to a predetermined orientation, or so as to adjust brightness of direct reflected light information about the object detected to predetermined brightness.

(19)

The identification device according to (17) or (18), further including a storage unit configured to store the three-dimensional coordinate information about the object, in which the object identification unit identifies the object by comparing three-dimensional coordinate information stored beforehand about the object and the three-dimensional coordinate information newly calculated about the object.

(20)

The identification device according to any one of (1) to (19), further including the TOF sensor.

(21)

The identification device according to (20), in which a pixel region functioning as the TOF sensor and a signal processing circuit region functioning as the object detection unit and the object identification unit are provided to be stacked on each other.

(22)

An electronic device having an identification device mounted on the electronic device, in which the identification device includes a direct reflected light information calculation unit configured to calculate, on the basis of sensing data by a TOF sensor that applies light to an object to detect the light, direct reflected light information about direct reflected light from the object, an object detection unit configured to detect the object on the basis of the direct reflected light information, and an object identification unit configured to identify the object on the basis of the direct reflected light information about the object detected.

REFERENCE SIGNS LIST

10 identification system
20, 20*a* stacked image sensor 100, 980 TOF sensor
102 irradiation unit
104, 104a, 104b light receiving unit
120 pixel region
200 processing unit
202 distance information calculation unit
204 direct reflected light calculation unit
206 subject detection unit
208 three-dimensional conversion unit
210 subject normalization unit
212 subject identification unit
220 signal processing circuit region
300 storage unit
320 memory region
400 display unit
502, 502a registration face image
504, 504b, 504c, 504d comparison face image
600 range image
602, 602a registration range image
604, 604b, 604c, 604d comparison range image
700 direct reflected light image
702, 702a registration direct reflected light image
704, 704b, 704c, 704d comparison direct reflected light image
612, 620, 622, 710, 712 subject region
800a, 800b region
900 electronic device
950 CPU
952 ROM
954 RAM
956 recording medium
958 input/output interface
960 operation input device
962 display device
968 communication interface
970 bus

The invention claimed is:

1. An identification device comprising:
circuitry configured to function as:
a direct reflected light information calculation unit configured to calculate, on a basis of sensing data by a TOF sensor that applies light to an object to detect the light, direct reflected light information about direct reflected light from the object;
an object detection unit configured to detect the object on a basis of the direct reflected light information;
an object identification unit configured to identify the object on a basis of the direct reflected light information about the object detected; and
a normalization processing unit configured to normalize the direct reflected light information about the object detected so as to adjust an orientation of the object to a predetermined orientation.

2. The identification device according to claim 1, wherein the TOF sensor includes first and second light receiving units different in operation from each other, and
the direct reflected light information calculation unit calculates the direct reflected light information on a basis of intensity of the light detected by the first and second light receiving units.

3. The identification device according to claim 1, wherein the TOF sensor includes one light receiving unit, and first and second readout units configured to read out light received by the light receiving unit at different times, and
the direct reflected light information calculation unit calculates the direct reflected light information on a basis of intensity of the light read out by the first and second readout units.

4. The identification device according to claim 2, wherein the direct reflected light information calculation unit calculates the direct reflected light information on a basis of a difference between an integrated value of intensity of light detected by the first light receiving unit and an integrated value of intensity of light detected by the second light receiving unit.

5. The identification device according to claim 1, wherein the normalization processing unit normalizes the direct reflected light information about the object detected further
so as to adjust a distance from the TOF sensor to the object to a predetermined distance,
so as to adjust a size of the object to a predetermined size, or
so as to adjust brightness of the direct reflected light information about the object detected to predetermined brightness.

6. The identification device according to claim 1, further comprising a storage unit configured to store the direct reflected light information about the object,
wherein the object identification unit identifies the object by comparing direct reflected light information stored beforehand about the object and the direct reflected light information newly calculated about the object.

7. The identification device according to claim 6, wherein the storage unit stores direct reflected light information normalized about the object.

8. The identification device according to claim 1, further comprising a distance information calculation unit configured to calculate distance information about the object on a basis of the sensing data,
wherein the object identification unit identifies the object on a basis of the distance information.

9. The identification device according to claim 1, wherein the device further comprises the TOF sensor.

10. The identification device according to claim 9, wherein a pixel region functioning as the TOF sensor and a signal processing circuit region functioning as the object detection unit and the object identification unit are provided to be stacked on each other.

11. An identification device comprising:
circuitry configured to function as:
a distance information calculation unit configured to calculate, on a basis of sensing data by a TOF sensor that applies light to an object to detect the light, distance information about the object;
an object detection unit configured to detect the object on a basis of the distance information;
an object identification unit configured to identify the object on a basis of the distance information about the object detected; and
a normalization processing unit configured to normalize the distance information about the object detected so as to adjust an orientation of the object to a predetermined orientation.

12. The identification device according to claim 11, wherein
the TOF sensor includes first and second light receiving units different in operation from each other, and
the distance information calculation unit calculates the distance information on a basis of intensity of the light detected by the first and second light receiving units.

13. The identification device according to claim 11, wherein
   the TOF sensor includes one light receiving unit, and first and second readout units configured to read out light received by the light receiving unit at different times, and
   the distance information calculation unit calculates the distance information on a basis of intensity of the light read out by the first and second readout units.

14. The identification device according to claim 12, wherein the distance information calculation unit calculates the distance information on a basis of a difference between an integrated value of intensity of light detected by the first light receiving unit and an integrated value of intensity of light detected by the second light receiving unit.

15. The identification device according to claim 11,
   wherein the normalization processing unit normalizes the distance information about the object detected
   so as to adjust a distance from the TOF sensor to the object to a predetermined distance,
   so as to adjust a size of the object to a predetermined size, or
   so as to adjust brightness of direct reflected light information about the object detected to predetermined brightness.

16. The identification device according to claim 11, further comprising a storage unit configured to store the distance information about the object,
   wherein the object identification unit identifies the object by comparing distance information stored beforehand about the object and the distance information newly calculated about the object.

17. The identification device according to claim 11, further comprising a three-dimensional coordinate calculation unit configured to calculate three-dimensional coordinate information about the object on a basis of the distance information,
   wherein the object identification unit identifies the object on a basis of the three-dimensional coordinate information.

18. The identification device according to claim 17, further comprising a normalization processing unit configured to normalize the three-dimensional coordinate information,
   wherein the normalization processing unit normalizes the three-dimensional coordinate information
   so as to adjust a distance from the TOF sensor to the object to a predetermined distance,
   so as to adjust a size of the object to a predetermined size,
   so as to adjust an orientation of the object to a predetermined orientation, or
   so as to adjust brightness of direct reflected light information about the object detected to predetermined brightness.

19. An electronic device having an identification device mounted on the electronic device, wherein
   the identification device includes circuitry configured to function as:
      a direct reflected light information calculation unit configured to calculate, on a basis of sensing data by a TOF sensor that applies light to an object to detect the light, direct reflected light information about direct reflected light from the object,
      an object detection unit configured to detect the object on a basis of the direct reflected light information,
      an object identification unit configured to identify the object on a basis of the direct reflected light information about the object detected, and
      a normalization processing unit configured to normalize the distance information about the object detected so as to adjust an orientation of the object to a predetermined orientation.

* * * * *